US011936604B2

United States Patent
Jakobsson

(10) Patent No.: US 11,936,604 B2
(45) Date of Patent: Mar. 19, 2024

(54) MULTI-LEVEL SECURITY ANALYSIS AND INTERMEDIATE DELIVERY OF AN ELECTRONIC MESSAGE

(71) Applicant: Agari Data, Inc., San Mateo, CA (US)

(72) Inventor: Bjorn Markus Jakobsson, Portola Valley, CA (US)

(73) Assignee: AGARI DATA, INC., San Mateo, CA (US)

( * ) Notice: Subject to any disclaimer, the term of this patent is extended or adjusted under 35 U.S.C. 154(b) by 0 days.

(21) Appl. No.: 15/786,126

(22) Filed: Oct. 17, 2017

(65) Prior Publication Data

US 2018/0091453 A1 Mar. 29, 2018

Related U.S. Application Data

(63) Continuation-in-part of application No. 15/453,737, filed on Mar. 8, 2017, now Pat. No. 9,847,973.

(60) Provisional application No. 62/412,196, filed on Oct. 24, 2016, provisional application No. 62/399,821, filed on Sep. 26, 2016.

(51) Int. Cl.
*H04L 9/00* (2022.01)
*H04L 9/40* (2022.01)
*H04L 51/212* (2022.01)
*H04L 51/08* (2022.01)
(Continued)

(52) U.S. Cl.
CPC ........ *H04L 51/212* (2022.05); *H04L 63/1408* (2013.01); *H04L 63/1441* (2013.01); *H04L 63/1483* (2013.01); *H04L 51/08* (2013.01); *H04L 51/18* (2013.01); *H04L 51/42* (2022.05)

(58) Field of Classification Search
CPC . H04L 51/12; H04L 63/1408; H04L 63/1441; H04L 63/1483; H04L 51/18; H04L 51/22; H04L 51/08
See application file for complete search history.

(56) References Cited

U.S. PATENT DOCUMENTS 6,073,142 A 6/2000 Geiger
6,161,130 A 12/2000 Horvitz
(Continued)

FOREIGN PATENT DOCUMENTS

JP 2011100489 5/2011
WO 2018213457 11/2018

OTHER PUBLICATIONS

A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.
(Continued)

*Primary Examiner* — Daniel B Potratz
*Assistant Examiner* — Syed M Ahsan
(74) *Attorney, Agent, or Firm* — Fredrikson & Byron, P.A.

(57) ABSTRACT

An initial risk of an electronic message is determined. Based on the initial risk, it is determined whether to modify the electronic message. In an event it is determined to modify the electronic message: the electronic message is modified; the modified electronic message is allowed to be delivered to an intended recipient of the electronic message; a secondary computer security risk assessment of the electronic message is automatically performed; and based on the secondary computer security risk assessment, the modified message is updated.

18 Claims, 13 Drawing Sheets

(51) Int. Cl.
  *H04L 51/18* (2022.01)
  *H04L 51/42* (2022.01)

(56) References Cited

U.S. PATENT DOCUMENTS

| | | |
|---|---|---|
| 6,574,658 B1 | 6/2003 | Gabber |
| 6,721,784 B1 | 4/2004 | Leonard |
| 7,194,618 B1 | 3/2007 | Suominen |
| 7,293,063 B1 | 11/2007 | Sobel |
| 7,299,261 B1 | 11/2007 | Oliver |
| 7,464,408 B1 | 12/2008 | Shah |
| 7,631,193 B1 | 12/2009 | Hoffman |
| 7,644,274 B1 | 1/2010 | Jakobsson |
| 7,668,951 B2 | 2/2010 | Lund |
| 7,680,890 B1 | 3/2010 | Lin |
| 7,748,038 B2 | 6/2010 | Olivier |
| 7,797,752 B1 * | 9/2010 | Vaidya .............. H04L 12/4641 717/172 |
| 7,809,795 B1 | 10/2010 | Cooley |
| 7,809,796 B1 | 10/2010 | Bloch |
| 7,814,545 B2 | 10/2010 | Oliver |
| 7,831,522 B1 | 11/2010 | Satish |
| 7,854,007 B2 | 12/2010 | Sprosts |
| 7,890,358 B2 | 2/2011 | Dutta |
| 7,899,213 B2 | 3/2011 | Otsuka |
| 7,899,866 B1 | 3/2011 | Buckingham |
| 7,917,655 B1 | 3/2011 | Coomer |
| 7,941,842 B2 | 5/2011 | Prince |
| 8,010,614 B1 | 8/2011 | Musat |
| 8,131,655 B1 | 3/2012 | Cosoi |
| 8,214,490 B1 | 7/2012 | Vos |
| 8,230,505 B1 | 7/2012 | Ahrens |
| 8,255,572 B1 | 8/2012 | Coomer |
| 8,365,258 B2 | 1/2013 | Dispensa |
| 8,484,295 B2 | 7/2013 | Chasin et al. |
| 8,489,689 B1 | 7/2013 | Sharma |
| 8,560,962 B2 | 10/2013 | Wang |
| 8,566,938 B1 | 10/2013 | Prakash |
| 8,572,184 B1 | 10/2013 | Cosoi |
| 8,583,915 B1 | 11/2013 | Huang |
| 8,667,069 B1 | 3/2014 | Connelly |
| 8,667,074 B1 | 3/2014 | Farkas |
| 8,667,581 B2 | 3/2014 | Steeves |
| 8,676,155 B2 | 3/2014 | Fan |
| 8,719,940 B1 | 5/2014 | Higbee |
| 8,752,172 B1 | 6/2014 | Dotan |
| 8,769,684 B2 | 7/2014 | Stolfo |
| 8,813,228 B2 | 8/2014 | Magee |
| 8,832,202 B2 | 9/2014 | Yoshioka |
| 8,880,604 B2 | 11/2014 | Chen |
| 8,904,524 B1 | 12/2014 | Hodgman |
| 8,931,041 B1 | 1/2015 | Banerjee |
| 8,949,353 B1 | 2/2015 | Beguin |
| 8,959,163 B1 | 2/2015 | Ledet |
| 8,984,640 B1 | 3/2015 | Emigh |
| 8,996,042 B1 | 3/2015 | Hannigan |
| 9,009,829 B2 | 4/2015 | Stolfo |
| 9,027,134 B2 | 5/2015 | Foster |
| 9,059,870 B1 * | 6/2015 | Sobel .................... H04L 51/066 |
| 9,060,057 B1 | 6/2015 | Danis |
| 9,118,653 B2 | 8/2015 | Nimashakavi |
| 9,154,514 B1 | 10/2015 | Prakash |
| 9,203,791 B1 | 12/2015 | Olomskiy |
| 9,245,115 B1 | 1/2016 | Jakobsson |
| 9,258,314 B1 | 2/2016 | Xiao |
| 9,277,049 B1 | 3/2016 | Danis |
| 9,332,022 B1 | 5/2016 | Ashley |
| 9,338,026 B2 | 5/2016 | Bandini |
| 9,338,287 B1 | 5/2016 | Russo |
| 9,471,714 B2 | 10/2016 | Iwasaki |
| 9,473,437 B1 | 10/2016 | Jakobsson |
| 9,491,155 B1 | 11/2016 | Johansson |
| 9,501,639 B2 | 11/2016 | Stolfo |
| 9,560,506 B2 | 1/2017 | Gudlavenkatasiva |
| 9,602,508 B1 | 3/2017 | Mahaffey |
| 9,613,341 B2 | 4/2017 | Shivakumar |
| 9,654,492 B2 | 5/2017 | Maylor |
| 9,686,297 B2 | 6/2017 | Starink et al. |
| 9,747,455 B1 | 8/2017 | Mcclintock |
| 9,781,149 B1 | 10/2017 | Himler |
| 9,800,589 B1 | 10/2017 | Asveren |
| 9,847,973 B1 | 12/2017 | Jakobsson |
| 9,906,554 B2 | 2/2018 | Higbee |
| 9,910,984 B2 | 3/2018 | Valencia |
| 9,940,482 B1 | 4/2018 | Nichols |
| 10,110,623 B2 | 10/2018 | Gatti |
| 10,122,715 B2 | 11/2018 | Dispensa |
| 10,129,194 B1 | 11/2018 | Jakobsson |
| 10,277,628 B1 | 4/2019 | Jakobsson |
| 10,694,029 B1 | 6/2020 | Jakobsson |
| 10,805,270 B2 | 10/2020 | Jakobsson et al. |
| 2002/0138271 A1 | 9/2002 | Shaw |
| 2002/0184315 A1 | 12/2002 | Earnest |
| 2003/0009694 A1 | 1/2003 | Wenocur |
| 2003/0023736 A1 | 1/2003 | Abkemeier |
| 2003/0200108 A1 | 10/2003 | Malnoe |
| 2003/0225850 A1 | 12/2003 | Teague |
| 2003/0229672 A1 | 12/2003 | Kohn |
| 2003/0236845 A1 | 12/2003 | Pitsos |
| 2004/0073617 A1 | 4/2004 | Milliken |
| 2004/0148358 A1 | 7/2004 | Singh |
| 2004/0176072 A1 | 9/2004 | Gellens |
| 2004/0177120 A1 | 9/2004 | Kirsch |
| 2004/0203589 A1 | 10/2004 | Wang |
| 2004/0215977 A1 | 10/2004 | Goodman |
| 2005/0021649 A1 | 1/2005 | Goodman |
| 2005/0033810 A1 | 2/2005 | Malcolm |
| 2005/0060643 A1 | 3/2005 | Glass |
| 2005/0076084 A1 | 4/2005 | Loughmiller |
| 2005/0076240 A1 | 4/2005 | Appleman |
| 2005/0080857 A1 | 4/2005 | Kirsch |
| 2005/0091320 A1 | 4/2005 | Kirsch |
| 2005/0097320 A1 | 5/2005 | Golan |
| 2005/0182735 A1 | 8/2005 | Zager |
| 2005/0188023 A1 | 8/2005 | Doan |
| 2005/0188045 A1 | 8/2005 | Katsikas |
| 2005/0198159 A1 | 9/2005 | Kirsch |
| 2005/0198173 A1 | 9/2005 | Evans |
| 2005/0216587 A1 | 9/2005 | John |
| 2005/0223076 A1 | 10/2005 | Barrus |
| 2005/0235065 A1 | 10/2005 | Le |
| 2005/0257261 A1 | 11/2005 | Shraim |
| 2005/0283837 A1 | 12/2005 | Olivier |
| 2006/0004772 A1 | 1/2006 | Hagan |
| 2006/0015563 A1 | 1/2006 | Judge |
| 2006/0018466 A1 | 1/2006 | Adelstein |
| 2006/0026242 A1 | 2/2006 | Kuhlmann |
| 2006/0031306 A1 | 2/2006 | Haverkos |
| 2006/0037075 A1 | 2/2006 | Frattura |
| 2006/0053279 A1 | 3/2006 | Coueignoux |
| 2006/0053490 A1 | 3/2006 | Herz |
| 2006/0085505 A1 | 4/2006 | Gillum |
| 2006/0095586 A1 | 5/2006 | Adelman et al. |
| 2006/0101334 A1 * | 5/2006 | Liao ....................... H04L 51/18 715/205 |
| 2006/0107323 A1 | 5/2006 | Mclean |
| 2006/0149821 A1 | 7/2006 | Rajan |
| 2006/0153380 A1 | 7/2006 | Gertner |
| 2006/0161989 A1 | 7/2006 | Reshef |
| 2006/0168024 A1 | 7/2006 | Mehr |
| 2006/0168329 A1 | 7/2006 | Tan |
| 2006/0195542 A1 | 8/2006 | Nandhra |
| 2006/0206713 A1 | 9/2006 | Hickman |
| 2006/0224677 A1 | 10/2006 | Ishikawa |
| 2006/0230461 A1 | 10/2006 | Hauser |
| 2006/0253597 A1 | 11/2006 | Mujica |
| 2006/0259558 A1 | 11/2006 | Yen |
| 2006/0265498 A1 | 11/2006 | Turgeman |
| 2006/0277259 A1 | 12/2006 | Murphy |
| 2006/0282660 A1 | 12/2006 | Varghese |
| 2007/0019235 A1 | 1/2007 | Lee |
| 2007/0027992 A1 | 2/2007 | Judge |
| 2007/0035390 A1 | 2/2007 | Thomas |
| 2007/0038718 A1 | 2/2007 | Khoo |

(56) References Cited

U.S. PATENT DOCUMENTS

| | | | |
|---|---|---|---|
| 2007/0067465 A1 | 3/2007 | Blinn | |
| 2007/0078936 A1 | 4/2007 | Quinlan | |
| 2007/0079379 A1 | 4/2007 | Sprosts | |
| 2007/0086592 A1 | 4/2007 | Ellison | |
| 2007/0100944 A1 | 5/2007 | Ford | |
| 2007/0101423 A1 | 5/2007 | Oliver | |
| 2007/0107053 A1 | 5/2007 | Shraim | |
| 2007/0130618 A1 | 6/2007 | Chen | |
| 2007/0136573 A1 | 6/2007 | Steinberg | |
| 2007/0136806 A1* | 6/2007 | Berman | G06Q 10/107 726/22 |
| 2007/0143407 A1 | 6/2007 | Avritch | |
| 2007/0143432 A1 | 6/2007 | Klos | |
| 2007/0162742 A1 | 7/2007 | Song | |
| 2007/0192169 A1 | 8/2007 | Herbrich | |
| 2007/0198642 A1 | 8/2007 | Malik | |
| 2007/0208850 A1 | 9/2007 | Lin | |
| 2007/0214495 A1 | 9/2007 | Royer | |
| 2007/0239639 A1 | 10/2007 | Loughmiller | |
| 2007/0271343 A1 | 11/2007 | George | |
| 2007/0276907 A1 | 11/2007 | Maes | |
| 2007/0282770 A1 | 12/2007 | Choi | |
| 2007/0289018 A1 | 12/2007 | Steeves | |
| 2007/0299916 A1 | 12/2007 | Bates | |
| 2008/0004049 A1 | 1/2008 | Yigang | |
| 2008/0022013 A1 | 1/2008 | Adelman | |
| 2008/0022107 A1 | 1/2008 | Pickles | |
| 2008/0046970 A1 | 2/2008 | Oliver | |
| 2008/0050014 A1 | 2/2008 | Bradski | |
| 2008/0098237 A1 | 4/2008 | Dung | |
| 2008/0104180 A1 | 5/2008 | Gabe | |
| 2008/0104235 A1 | 5/2008 | Oliver | |
| 2008/0141374 A1 | 6/2008 | Sidiroglou | |
| 2008/0175266 A1 | 7/2008 | Alperovitch | |
| 2008/0178288 A1 | 7/2008 | Alperovitch | |
| 2008/0235794 A1 | 9/2008 | Bogner | |
| 2008/0263670 A1 | 10/2008 | Stavrica | |
| 2008/0276315 A1 | 11/2008 | Shuster | |
| 2008/0290154 A1 | 11/2008 | Barnhardt | |
| 2009/0037350 A1 | 2/2009 | Rudat | |
| 2009/0064330 A1 | 3/2009 | Shraim | |
| 2009/0089859 A1 | 4/2009 | Cook | |
| 2009/0157708 A1 | 6/2009 | Bandini | |
| 2009/0210708 A1 | 8/2009 | Chou | |
| 2009/0228583 A1 | 9/2009 | Pocklington | |
| 2009/0252159 A1 | 10/2009 | Lawson | |
| 2009/0260064 A1 | 10/2009 | Mcdowell | |
| 2009/0292781 A1 | 11/2009 | Teng | |
| 2009/0319629 A1 | 12/2009 | De Guerre | |
| 2010/0005191 A1 | 1/2010 | Drako | |
| 2010/0030798 A1 | 2/2010 | Kumar | |
| 2010/0043071 A1 | 2/2010 | Wang | |
| 2010/0054443 A1 | 3/2010 | Bhattiprolu | |
| 2010/0070761 A1 | 3/2010 | Gustave | |
| 2010/0077483 A1 | 3/2010 | Stolfo | |
| 2010/0082758 A1 | 4/2010 | Golan | |
| 2010/0094887 A1 | 4/2010 | Ye | |
| 2010/0095374 A1 | 4/2010 | Gillum | |
| 2010/0115040 A1 | 5/2010 | Sargent | |
| 2010/0145900 A1 | 6/2010 | Zheng | |
| 2010/0198928 A1 | 8/2010 | Almeida | |
| 2010/0235636 A1* | 9/2010 | Cohen | H04L 51/066 713/168 |
| 2010/0257222 A1 | 10/2010 | Hamilton, II | |
| 2010/0287246 A1 | 11/2010 | Klos | |
| 2010/0293382 A1 | 11/2010 | Hammad | |
| 2010/0299399 A1 | 11/2010 | Wanser | |
| 2010/0313253 A1 | 12/2010 | Reiss | |
| 2011/0061089 A1* | 3/2011 | O'Sullivan | H04L 63/102 726/1 |
| 2011/0066687 A1 | 3/2011 | Chen | |
| 2011/0087485 A1 | 4/2011 | Maude | |
| 2011/0145152 A1 | 6/2011 | Mccown | |
| 2011/0191688 A1 | 8/2011 | Hasegawa | |
| 2011/0191847 A1 | 8/2011 | Davis | |
| 2011/0214187 A1 | 9/2011 | Wittenstein | |
| 2011/0271349 A1 | 11/2011 | Kaplan | |
| 2011/0294478 A1 | 12/2011 | Trivi | |
| 2012/0030293 A1 | 2/2012 | Bobotek | |
| 2012/0084866 A1 | 4/2012 | Stolfo | |
| 2012/0102566 A1 | 4/2012 | Vrancken | |
| 2012/0136780 A1 | 5/2012 | El-Awady | |
| 2012/0167233 A1 | 6/2012 | Gillum | |
| 2012/0191615 A1 | 7/2012 | Schibuk | |
| 2012/0192258 A1 | 7/2012 | Spencer | |
| 2012/0198017 A1* | 8/2012 | LeVasseur | H04L 63/0428 709/206 |
| 2012/0204032 A1 | 8/2012 | Wilkins | |
| 2012/0204221 A1 | 8/2012 | Monjas Llorente | |
| 2012/0227104 A1 | 9/2012 | Sinha | |
| 2012/0242488 A1 | 9/2012 | Wilson | |
| 2012/0246725 A1 | 9/2012 | Osipkov | |
| 2012/0253810 A1 | 10/2012 | Sutton | |
| 2012/0278694 A1 | 11/2012 | Washio | |
| 2012/0311703 A1 | 12/2012 | Yanovsky | |
| 2013/0036455 A1 | 2/2013 | Bodi | |
| 2013/0060905 A1 | 3/2013 | Mickens | |
| 2013/0067012 A1 | 3/2013 | Matzkel | |
| 2013/0081142 A1 | 3/2013 | Mcdougal | |
| 2013/0083129 A1 | 4/2013 | Thompson | |
| 2013/0086645 A1 | 4/2013 | Srinivasan | |
| 2013/0104198 A1 | 4/2013 | Grim | |
| 2013/0128883 A1 | 5/2013 | Lawson | |
| 2013/0173712 A1 | 7/2013 | Monjas Llorente | |
| 2013/0185775 A1 | 7/2013 | Dispensa | |
| 2013/0263226 A1 | 10/2013 | Sudia | |
| 2013/0305318 A1 | 11/2013 | Deluca | |
| 2013/0318580 A1 | 11/2013 | Gudlavenkatasiva | |
| 2013/0340079 A1 | 12/2013 | Gottlieb | |
| 2013/0346528 A1 | 12/2013 | Shinde | |
| 2014/0007238 A1 | 1/2014 | Magee | |
| 2014/0082726 A1 | 3/2014 | Dreller | |
| 2014/0173723 A1 | 6/2014 | Singla et al. | |
| 2014/0187203 A1 | 7/2014 | Bombacino | |
| 2014/0189808 A1 | 7/2014 | Mahaffey | |
| 2014/0214895 A1 | 7/2014 | Higgins | |
| 2014/0230061 A1 | 8/2014 | Higbee | |
| 2014/0245396 A1 | 8/2014 | Oberheide | |
| 2014/0250506 A1 | 9/2014 | Hallam-Baker | |
| 2014/0258420 A1 | 9/2014 | Dent | |
| 2014/0259158 A1 | 9/2014 | Brown | |
| 2014/0317697 A1 | 10/2014 | Nimashakavi | |
| 2014/0340822 A1 | 11/2014 | Lal | |
| 2014/0366144 A1 | 12/2014 | Alperovitch | |
| 2015/0030156 A1 | 1/2015 | Perez | |
| 2015/0033343 A1 | 1/2015 | Jiang | |
| 2015/0067833 A1 | 3/2015 | Verma | |
| 2015/0081722 A1 | 3/2015 | Terada | |
| 2015/0082451 A1 | 3/2015 | Ciancio-Bunch | |
| 2015/0100896 A1 | 4/2015 | Shmarovoz | |
| 2015/0113627 A1 | 4/2015 | Curtis | |
| 2015/0148006 A1 | 5/2015 | Skudlark | |
| 2015/0156154 A1 | 6/2015 | Russell | |
| 2015/0172233 A1 | 6/2015 | She | |
| 2015/0216413 A1 | 8/2015 | Soyao | |
| 2015/0236990 A1 | 8/2015 | Shan | |
| 2015/0288714 A1* | 10/2015 | Emigh | G06Q 30/018 726/22 |
| 2015/0326510 A1 | 11/2015 | Tomlinson | |
| 2015/0334065 A1 | 11/2015 | Yan | |
| 2015/0363839 A1 | 12/2015 | Zolty | |
| 2015/0371212 A1 | 12/2015 | Giordano | |
| 2015/0381653 A1 | 12/2015 | Starink | |
| 2016/0012222 A1 | 1/2016 | Stolfo | |
| 2016/0014151 A1 | 1/2016 | Prakash | |
| 2016/0037270 A1 | 2/2016 | Polinske | |
| 2016/0087925 A1 | 3/2016 | Kalavagattu | |
| 2016/0094566 A1 | 3/2016 | Parekh | |
| 2016/0104132 A1 | 4/2016 | Abbatiello | |
| 2016/0210662 A1 | 7/2016 | Duggal | |
| 2016/0225897 A1 | 8/2016 | Sridhar | |
| 2016/0269437 A1* | 9/2016 | McDougal | H04L 63/145 |
| 2016/0277485 A1 | 9/2016 | Abrams | |
| 2016/0352840 A1 | 12/2016 | Negron | |

(56) References Cited

U.S. PATENT DOCUMENTS

| | | |
|---|---|---|
| 2016/0359790 A1 | 12/2016 | Zhang |
| 2017/0005961 A1 | 1/2017 | Liebmann |
| 2017/0078321 A1 | 3/2017 | Maylor |
| 2017/0085584 A1 | 3/2017 | Goutal |
| 2017/0091274 A1 | 3/2017 | Guo |
| 2017/0126661 A1 | 5/2017 | Brannon |
| 2017/0134423 A1 | 5/2017 | Sysman |
| 2017/0195310 A1 | 7/2017 | Tyler |
| 2017/0206545 A1 | 7/2017 | Gupta |
| 2017/0223034 A1 | 8/2017 | Singh |
| 2017/0230323 A1 | 8/2017 | Jakobsson |
| 2017/0251006 A1 | 8/2017 | Larosa |
| 2017/0324767 A1 | 11/2017 | Srivastava |
| 2017/0331816 A1 | 11/2017 | Votaw |
| 2017/0331824 A1 | 11/2017 | Pender |
| 2018/0041491 A1 | 2/2018 | Gupta |
| 2018/0041515 A1 | 2/2018 | Gupta |
| 2018/0091453 A1 | 3/2018 | Jakobsson |
| 2018/0097841 A1 | 4/2018 | Stolarz |
| 2018/0131686 A1 | 5/2018 | Brannon |
| 2018/0160387 A1 | 6/2018 | Chastain |
| 2018/0184289 A1 | 6/2018 | Dudley |
| 2018/0314700 A1 | 11/2018 | Liu |
| 2018/0343246 A1 | 11/2018 | Benayed |
| 2019/0012478 A1 | 1/2019 | Narayanaswamy |
| 2019/0052655 A1 | 2/2019 | Benishti |
| 2019/0095498 A1 | 3/2019 | Srinivasan |
| 2019/0095516 A1 | 3/2019 | Srinivasan |
| 2019/0306237 A1 | 10/2019 | Srinivasan |
| 2020/0067861 A1 | 2/2020 | Leddy et al. |
| 2020/0076817 A1 | 3/2020 | Gupta et al. |
| 2020/0244638 A1 | 7/2020 | Gupta et al. |
| 2020/0264860 A1 | 8/2020 | Srinivasan et al. |
| 2020/0265062 A1 | 8/2020 | Srinivasan et al. |

OTHER PUBLICATIONS

Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

Author Unknown, "Babastik: AntiSpam Personal", downloaded from "https://web.archive.org/web/20101031061734/babastik.com/AntiSpam-Personal/", Oct. 31, 2010.

Author Unknown, "bluebottle—trusted delivery", downloaded from "https://web.archive.org/web/20140715223712/https://bluebottle.com/trusted-delivery.php", Jul. 15, 2014.

Author Unknown, "Federal Court Denies Attempt By Mailblocks, Inc. To Shut Down Spamarrest LLC", downloaded from "http://www.spamarrest.com/pr/releases/20030611.jsp", Seattle, WA, Jun. 11, 2003.

Author Unknown, "First of all, Your Software is Excellent", downloaded from "https://web.archive.org/web/20120182074130/http://www.spamresearchcenter.com/", Aug. 12, 2012.

Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.

Author Unknown, "Junk Mail Buffering Agent", downloaded from http://www.ivarch.com/programs/jmba.shtml, Jun. 2005.

Author Unknown, "No. Software to Install", downloaded from "https://web.archive.org/web/201002095356/http://www.cleanmymailbox.com:80/howitworks.html", Oct. 2, 2010.

Author Unknown, "Rejecting spam with a procmail accept list", downloaded from "https://web.archive.org/web/20160320083258/http:/angel.net/~nic/spam-x/", Mar. 20, 2016.

Author Unknown, "SpamFry: Welcome to our Beta testers", downloaded from https://web.archive.org/web/20050404214637/http:www.spamfry.net:80/, Apr. 4, 2005.

Author Unknown, "Sporkie" From Syncelus Wiki, retrieved from "http://wiki.syncleus.com/index.php? title=Sporkie&oldid=1034 (https://web.archive.org/web/20150905224202/http://wiki.syncleus.com/index.php? title=Sporkie&oldid=1034)", Sep. 2015.

Author Unknown, "Stop Spam Mail, Block Offensive Materials, Save Time and Money", iPermitMail Email Firewall Version 3.0, 2003.

Author Unknown, (Steven)—Artificial Intelligence for your email, downloaded from "https://web.archive.org/web/20140607193205/http://www.softwaredevelopment.net.au:80/pge_steven.htm", Jun. 7, 2014.

Author Unknown, 0Spam.com, Frequently Asked Questions, downloaded from "https://web.archive.org/web/20150428181716/http://www.Ospam.com:80/support.shtml#whatisit", Apr. 28, 2015.

Author Unknown, Affini: A Network of Trust, downloaded from https://web.archive.org/web/20100212113200/http://www.affini.com:80/main/info.html, Feb. 12, 2010.

Author Unknown, Alan Clifford's Software Page, downloaded from "https://web.archive.org/web/20150813112933/http:/clifford.ac/software.html", Aug. 13, 2015.

Author Unknown, ASB AntiSpam official home page, downloaded from "https://web.archive.org/web/20080605074520/http://asbsoft.netwu.com:80/index.html", Jun. 5, 2008.

Author Unknown, Boxbe, Wikipedia, Nov. 17, 2016, https://en.wikipedia.org/wiki/Boxbe?wprov=sfsi1.

Author Unknown, BoxSentry, An advanced email validation facility to prevent Spam, downloaded from "https://web.archive.org/web/20040803060108/http://www.boxsentry.com:80/workings.html", Aug. 3, 2004.

Author Unknown, Captcha: Telling Humans and Computers Apart Automatically, downloaded from "https://web.archive.org/web/20160124075223/http:/www.captcha.net/", Jan. 24, 2016.

Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.

Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.

Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.

Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.

Author Unknown, Home: About.com, downloaded from "https://web.archive.org/web/20110201205543/quarantinemail.com/" Feb. 1, 2011.

Author Unknown, How ChoiceMail Works, downloaded from "https://web.archive.org/web/20160111013759/http://www.digiportal.com:80/products/how-choicemail-works.html", Jan. 11, 2016.

Author Unknown, How Mail Unknown works., downloaded from "https://web.archive.org/web/20100123200126/http://www.mailunknown.com:80/HowMailUnknownWorks.asp#VerifyValidate", Jan. 23, 2010.

Author Unknown, Joe Maimon—Sendmail Page, downloaded from "https://web.archive.org/web/20150820074626/http:/www.jmaimon.com/sendmail/" Aug. 20, 2015.

Author Unknown, Kens Spam Filter 1.40, downloaded from "https://web.archive.org/web/20080317184558/http://www.kensmail.net:80/spam.html", Mar. 17, 2008.

Author Unknown, mailcircuit.com, Secure: Spam Protection, downloaded from "https://web.archive.org/web/20131109042243/http:/www.mailcircuit.com/secure/", Nov. 9, 2013.

(56) References Cited

OTHER PUBLICATIONS

Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https://www.myprivacy.ca/", Feb. 4, 2016.
Author Unknown, PermitMail, Products: The most advanced email firewall available for your business", downloaded from "https://web.archive.org/web/20160219151855/http://ipermitmail.com/products/, Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge And Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm - How it works, downloaded from https://web.archive.org/web/20150915060329/http:/smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.
Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, SPAM Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.
Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.
Author Unknown, SPAMjadoo: Ultimate Spam Protection, downloaded from "https://web.archive.org/web/20140512000636/http:/www.spamjadoo.com:80/esp-explained.htm" May 12, 2014.
Author Unknown, SpamKilling, "What is AntiSpam?", downloaded from "https://web.archive.org/web/20100411141933/http:/www.spamkilling.com:80/home_html.htm", Apr. 11, 2010.
Author Unknown, SpamRestraint.com: How does it work?, downloaded from "https://web.archive.org/web/20050206071926/http://www.spamrestraint.com:80/moreinfo.html", Feb. 6, 2005.
Author Unknown, Tagged Message Delivery Agent (TMDA), downloaded from "http://web.archive.org/web/20160122072207/http://www.tmda.net/", Jan. 22, 2016.
Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.
Author Unknown, V@nquishLabs, How it Works: Features, downloaded from "https://web.archive.org/web/20081015072416/http://vanquish.com/features/features_how_it_works.shtml", Oct. 15, 2008.
Author Unknown, What is Auto Spam Killer, downloaded from "https://web.archive.org./web/20090215025157/http://knockmail.com:80/support/descriptionask.html", Feb. 15, 2009.
Author Unknown, White List Email (WLE), downloaded from "https://web.archive.org/web/20150912154811/http:/www.rfc1149.net/devel/wle.html", Sep. 12, 2015.
Bjorn Markus Jakobsson, U.S. Appl. No. 14/487,989 entitled "Detecting Phishing Attempts" filed Sep. 16, 2014.
Bjorn Markus Jakobsson, U.S. Appl. No. 14/535,064 entitled "Validating Automatic Number Identification Data" filed Nov. 6, 2014.
Bjorn Markus Jakobsson, U.S. Appl. No. 15/235,058 entitled "Tertiary Classification of Communications", filed Aug. 11, 2016.
Bjorn Markus Jakobsson, U.S. Appl. No. 15/414,489, entitled "Detection of Business Email Compromise", filed Jan. 24, 2017.
Brad Templeton, "Proper principles for Challenge/Response anti-spam systems", downloaded from "http://web.archive.org/web/2015090608593/http://www.templetons.com/brad/spam/challengeresponse.html", Sep. 6, 2015.
Danny Sleator, "Blowback: A Spam Blocking System", downlaoded from "https://web.archive.org/web/20150910031444/http://www.cs.cmu.edu/~sleator/blowback", Sep. 10, 2015.
David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.
Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.
Jakobsson et al., U.S. Appl. No. 15/453,737 entitled "Mitigating Communication Risk By Detecting Similarity To a Trusted Message Contact" filed Mar. 8, 2017.
Jakobsson et al., U.S. Appl. No. 15/453,741 entitled "Mitigating Communication Risk By Verifying a Sender of a Message" filed Mar. 8, 2017.
James Thornton, "Challenge/Response at the SMTP Level", downloaded from "https://web.archive.org/web/20140215111642/http://original.jamesthornton.com/writing/challenge-response-at-smtp-level.html", Feb. 15, 2014.
Karsten M. Self, "Challenge-Response Anti-Spam Systems Considered Harmful", downloaded from "ftp://linuxmafia.com/faq/Mail/challenge-response.html", last updated Dec. 29, 2003.

(56) References Cited

OTHER PUBLICATIONS

Leddy et al., U.S. Patent Application No. 14/963,116 entitled "Scam Evaluation System" filed Dec. 8, 2015.
M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.
Marco Paganini, Active Spam Killer, "How It Works", downloaded from "https://web.archive.org/web/20150616133020/http:/a-s-k.sourceforge.net:80/howitworks.html", Jun. 16, 2015.
NIST. Usability of Security. http://csrc.nist.gov/security-usability/HTML/research.html.
Park et al., "Scambaiter: Understanding Targeted Nigerian Scams on Craigslist", published in Network and Distributed System Security Symposium (NDSS), 2014.
Peter Simons, "mapSoN 3.x User's Manual", downloaded from "https://web.archive.org/web/20140626054320/http:/mapson.sourceforge.net/", Jun. 26, 2014.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
Ronald L. Rivest, "RSF Quickstart Guide", Sep. 1, 2004.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.
Entrust: "Strong Multifactor Authentication Methods from Entrust IdentityGuard," https://web.archive.org/web/20110825101942/http://www.entrust.com/strong-authentication/authenticators.htm. Aug. 25, 2011.
Entrust: Mobile Authentication and Transaction Verification1,2,3, https://web.archive.org/web/20110814071521/http://www.entrust.com/mobile-security. Aug. 14, 2011.
Entrust: Proven Transaction Verification on Smartphones & Mobile Devices—Entrust,https://web.archive.org/web/20110918231205/http://www.entrust.com/transaction-verification/index.htm. Sep. 18, 2011.
Entrust: WP_Securing_Whats_At_Risk_Jul. 8, https://web.archive.org/web/20110809104408/http://download.entrust.com/resources/download.cfm/22313/. Aug. 9, 2011.
ESphinx: ("Cyota launches new authentication platform for online banking," https://web.archive.org/web/20050508152420/http://www.cyota.com/news.asp?id=173. May 8, 2005.
ESphinx: "Cyota and Quova Reducing Online Fraud with Cyota's eVision Technology," https://web.archive.org/web/20060307092523/http://www.cyota.com/press-releases.asp?id=81. Mar. 7, 2006.
ESphinx: "Cyota eSphinx," https://web.archive.org/web/20051214102438/http://www.cyota.com/product_7.asp. Dec. 14, 2020.
ESphinx: Cyota releases eSphinx online authentication package, https://web.archive.org/web/20050508152435/http://www.cyota.com/news.asp?id=170. May 8, 2005.
ESphinx: "How Does it Work?"; https://web.archive.org/web/20051210112946/http://www.cyota.com/product_7_19.asp. Dec. 10, 2005.
ESphinx: "Key Features," https://web.archive.org/web/20051210114904/http://www.cyota.com/product_7_18.asp. Dec. 10, 2005.
Green Armor: Dec. 8, 2005 Press Release: "Green Armor Solutions™ Introduces Identity Cues Two Factor™"; http://www.greenarmor.com/Green_Armor_Solutions_News-2005-12-07.shtml.
Green Armor: Green Armor Solutions "Identity Cues Products"; https://web.archive.org/web/20060110032814/http:/www.greenarmor.com/products.shtml. Jan. 10, 2006.
Green Armor: Green Armor Solutions "Identity Cues Two Factor ™ & Two Way Authentication"; https://web.archive.prg/web/20060209211113/http:/www.greenarmor.com/DataSheets/Identity%20Cues%20Two%20Factor%20Data%20Sheet.pdf. Feb. 9, 2006.
Kim et al., Context Information-based application access central model, IMCOM '16: Proceedings of the 10th International Conference on Ubiquitous Information Management and Communication. Jan. 2016, Article No. 75, pp. 1-5 (Year: 2016).
Robinson et al., Caching Context Information in Persvasive System, MDS '06: Proceedings of the 3rd International Middleware doctoral Symposium. Nov. 2006, pp. 1 (Year: 2006).
RSAa 7035_CONPRO_SB_0711: "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.
RSA 9697_AATF_SB_0808: "RSA Adaptive Authentication overview solution brief"; https://web.archive.org/web/20101225124323/http://www.rsa.com/products/consumer/sb/9697_AATF_SB_0808.pdf. Dec. 25, 2010.
RSA AAAM_SB_0208: "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.
Toopher: https://web.archive.org/web/20120430105502/http://toopher.com/. Apr. 30, 2012.
Toopher: Toopher Developer Documentation; https://web.archive.org/web/20120523192419/https://www.toopher.com/ developers.html. May 23, 2012.
U.S. Appl. No. 61/551,370, filed Oct. 25, 2011.
Adrian E. McElligot, "A Security pass for messages: message keys", CEAS '11: Proceedings of the 8th Annual Collaboration, Electronic messaging, Anti-abuse and Spam Conference. pp 184-192 (Year: 2011).
Akin et al., "Efficient hardware implementations of high throughput SHA-3 candidates keccak, luffa and blue midnight wish for single- and multi-message hashing", SIN '10: Proceedings of the 3rd international conference on security of Information and network. pp 168-177 (Year: 2010).
Binkley et al., "Improving identifier informativeness using part of speech information", MSR '11: Proceedings of the 8th Working Conference on Mining Software Repositories. May 2011, pp. 203-206. (Year: 2011).
Heinermann et al., "Recommending API methods based on identifier contexts", SUITE '11: Proceedings of the 3rd International Workshop on Search-Driven Development: Users, Infrastructure, Tools, and Evaluation. May 2011, pp. 1-4. (Year: 2011).
Laszka et al., "Integrity assurance in resource-bounded systems through stochastic message authentication", HotSoS '15: Proceedings of the 2015 Symposium and Bootcamp on the Science of security. Apr. 2015, Article No. 1, pp. 1-12. https://doi.org/ (Year: 2015).
Peterson et al. "Authenticated Identity Management in the Session Initiation Protocol (SIP)". Jul. 15, 2013. https://www.ietf.org/archive/id/draft-jennings-dispatch-rfc4474bis-01.txt.
Peterson et al. "Authenticated Identity Management in the Session Initiation Protocol (SIP)". May 29, 2013. https://datatracker.ietf.org/doc/draft-jennings-dispatch-rfc4474bis/00/.
Search Query Report from IP.com (performed Jul. 31, 2020) (Year: 2020).
Tyagi et al., "Traceback for End-to-End Encrypted Messaging" CCS '19: Proceeding of 2019 ACM SIGSAC Conference on Computer and Communications Security. pp. 4134-430 (Year: 2019).
Search Query Report from IP.com (performed Apr. 8, 2021) (Year: 2021).
Search Query Report from IP.com (performed Jan. 6, 2020) (Year: 2020).
Smith et al. Your Quick Guide to: Email Reputation and Email Engagement Metrics, Nov. 12, 2014, 4 pgs.

* cited by examiner

Patrick Peterson <ppeterson909@yahoo.com>
To: Markus Jakobsson <mjakobsson@agari.com>
need your help This message was flagged. Before you can respond to it, you need to classify it.
Click to select:

This email is from
- 🙂 a colleague
- 🏢 a company I do business with
- 😊 a friend or acquaintance
- 😐 a stranger —— Original message sent by ppeterson909@yahoo.com:

Hi Markus,

Are you at your desk? I need to talk to you.

Cheers,
Pat

Portions of the email may be obfuscated, and any web-links disabled. Classify the message to get full access.
Why was this message flagged?

FIG. 10B

Markus Jakobsson <mjakobsson@agari.com>
To: ppeterson1011@yahoo.com
Reply-To: noreply@agari.com
Automated response - your message has been quarantined Hi Patrick Peterson, You recently sent a message to Markus Jakobsson <mjakobsson@agari.com>. The message has been placed in quarantine.

It is possible that you normally communicate with Markus Jakobsson <mjakobsson@agari.com> using another email address that is whitelisted by the security system.
If you think that is so, then here is what you must do to also whitelist your email address ppeterson1011@yahoo.com 1. Forward this message in its entirety to the email address you normally use to communicate with Markus Jakobsson <mjakobsson@agari.com>.
2. Log in to that email account, find your forwarded message, and forward it again to whitelist@agari.com from that account.
3. You will then receive a confirmation email, and your message will be removed from quarantine and delivered.
4. You will only have to do this once for this email account, and not for each email you send.

Thanks, and have a good day!
The Agari Team

Security code GF686L88.

FIG. 11B

MULTI-LEVEL SECURITY ANALYSIS AND INTERMEDIATE DELIVERY OF AN ELECTRONIC MESSAGE

CROSS REFERENCE TO OTHER APPLICATIONS

This application is a continuation-in-part of co-pending U.S. patent application Ser. No. 15/453,737 entitled MITIGATING COMMUNICATION RISK BY DETECTING SIMILARITY TO A TRUSTED MESSAGE CONTACT filed Mar. 8, 2017, which claims priority to U.S. Provisional Patent Application No. 62/399,821 entitled MITIGATING COMMUNICATION RISK filed Sep. 26, 2016 both of which are incorporated herein by reference for all purposes. This application claims priority to U.S. Provisional Patent Application No. 62/412,196 entitled ADDRESSING SOPHISTICATED COMMUNICATION ATTACKS filed Oct. 24, 2016 which is incorporated herein by reference for all purposes.

BACKGROUND OF THE INVENTION

Message filters such as spam filters and virus/malware scanners allow malicious and unwanted email messages to be automatically identified. However, as more complex attacks are likely to require more complex filters, comprising larger numbers of more complex rules, some of the best filters are increasingly taking longer to analyze messages.

In addition, it may soon be required for multiple independent filters to interact before a conclusive classification can be made. This will further increase the time to analyze a message. It is typically not acceptable to withhold incoming messages until computer security analysis has been completed. For example, if an email or text message is withheld for half an hour, then this could be cause for frustration, e.g., if the message is about one person locating another, as they are meeting for lunch. Moving questionable messages to a separate folder (e.g., much like a spam folder) as they are being assessed does not solve the problem, as most users will not want to constantly have to check their spam folders. At the same time, delivering fraudulent messages is clearly not a desirable solution either. The delays caused by filtering—and the associated fears of lost messages—may very well become the greatest liability when it comes to deploying strong security methods that may take a relatively long time to process. This is often due to the resistance among decision makers to accept security methods that have the potential of introducing noticeable delivery delays.

BRIEF DESCRIPTION OF THE DRAWINGS

Various embodiments of the invention are disclosed in the following detailed description and the accompanying drawings.

FIG. 10B shows an example of a modified message requesting manual classification of the sender of the message.

FIG. 11B shows an example of an automatic reply message requesting verification of an identity of the sender of the message.

DETAILED DESCRIPTION

Figure 1:
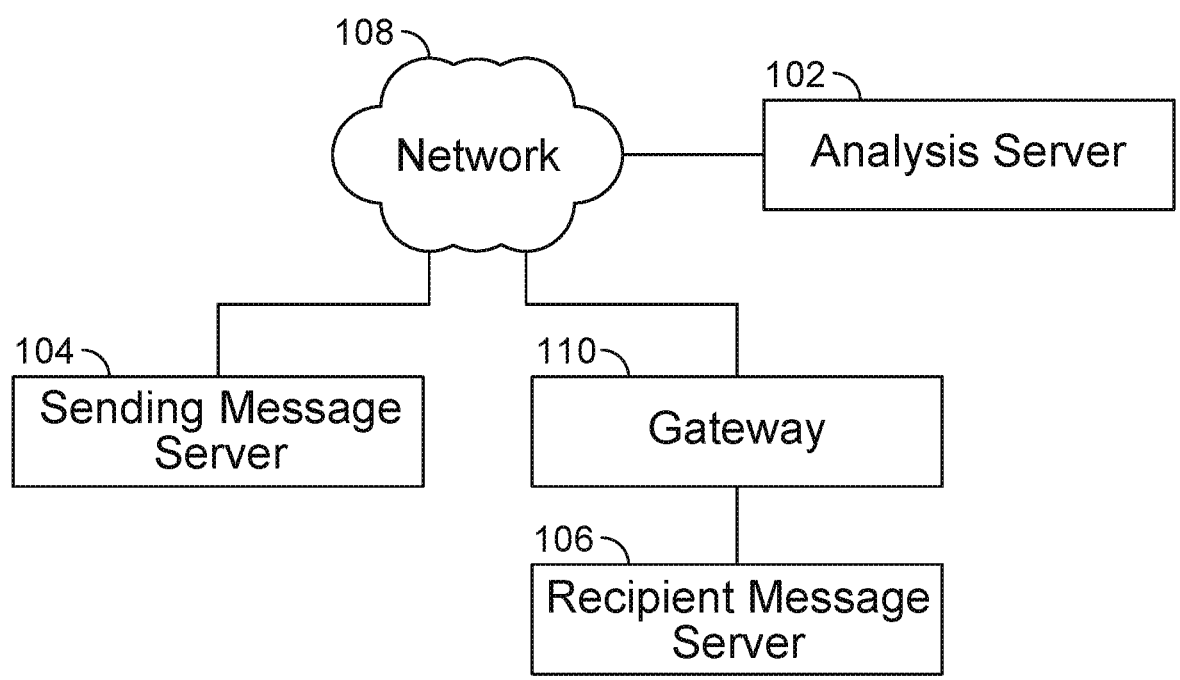
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, an initial risk of an electronic message is determined. Based on the initial risk, it is determined whether to modify the electronic message. In an event it is determined to modify the electronic message, the electronic message is modified and the modified message is allowed to be delivered. A secondary computer security risk assessment of the electronic message is automatically performed. Based on the secondary risk assessment, the modified message is updated. For example, a two-phase analysis process is utilized to achieve the benefits of speed with a fast initial analysis and accuracy of an in-depth secondary analysis. In an example first phase, a risk score is computed for each incoming message. Messages with a risk score corresponding to near-certainty malice (e.g., those containing known malware attachments) are blocked, and messages with a risk score corresponding to a near-certainty benevolence (e.g., messages from trusted parties, with no risky contents) are delivered. The remainder will be subject to careful scrutiny carried out in a second phase. This allows the undetermined emails to not be kept out of the inbox of the recipient as they are being subjected to additional scrutiny. For example, these undetermined emails are modified (e.g., neutralized) and delivered. The neutralization limits the functionality of the email but allows the recipient to access non-risky components while the second-phase filtering is performed. After the second phase of filtering concludes, the neutralization will be reverted (for safe emails) or a blocking action will be carried out.

This enables additional security measures that were not practically meaningful in a world where filtering decisions need to be made within milliseconds. For example, consider an email received from a trusted sender, e.g., a party with whom the recipient has communicated extensively in the past. Under normal circumstances, this would be considered safe. However, if the email contains high-risk content, such as apparent wiring instructions, and the email cannot be validated by the email sender authentication system, then the email poses a risk since the email may have been spoofed. To address this potential threat, the receiver's system can send an automated message to the apparent sender, asking this party to confirm having sent the email by clicking on a link or replying to the message. If an affirmative user response is received then this is evidence that the email was not spoofed, as an attacker that spoofs emails would not receive the confirmation request.

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is the last server that handled a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and filters it for potentially harmful or undesired messages. For example, incoming messages are filtered and analyzed for spam, viruses, spoofing, impersonation, and any other harmful or undesired content to detect, prevent, or minimize such messages from reaching a message recipient served by the recipient message server. In some embodiments, analysis server 102 determines and/or maintains a list of trusted contacts for one or more users (e.g., user accounts) of recipient message server 106. For example, by obtaining an address book from a user and/or observing message traffic to and from server 106 of the user, server 102 determines and/or maintains a list for each user.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message in the event a potential threat is detected. In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

In some embodiments, recipient message server 106 performs a risk analysis for an incoming message at least in part by performing an authenticity and/or reputation analysis to determine an overall measure of risk (e.g., risk score). Performing authenticity analysis may include determining a measure of confidence that a sender identified in the message (e.g., domain of sender) is the actual sender of the message. Performing reputation analysis may include determining a measure that an identified sender of the email (e.g., domain of sender) is likely to send a message that is of value to a recipient (e.g., likelihood of sending message that a recipient would want/desire to receive).

In some embodiments, determining authenticity of a message includes utilizing sender profiles that link an identifier of a sender to one or more IP addresses of servers determined to be associated with the sender. These sender profiles may be determined by analysis server 102 and/or the determined results are accessed by recipient message server 106 from analysis server 102 via network 108. For example, analysis server 102 is in communication with a plurality of different recipient message servers and analysis server 102 at least in part automatically determines associations between sender identifiers (e.g., network/Internet domain, email address, etc.) and IP addresses by analyzing messages that have been received at one or more recipient message servers. In some embodiments, a sender model of a sender may be specifically determined for a particular recipient (e.g., specific for all recipients of a particular domain, particular for an individual recipient, etc.). For example, a sender may only utilize a specific server with a first IP address for one group of recipients (e.g., recipients geographically located in North America) while another server with a second IP address is only utilized for another group of recipients (e.g., recipients geographically located in Asia).

In some embodiments, determining a reputation of a sender of a message includes utilizing a predetermined database of senders and their associated reputations. The reputations of senders may be determined by analysis server 102 and/or the determined reputations are accessed by recipient message server 106 from analysis server 102 via network 108. For example, analysis server 102 is in communication with a plurality of different recipient message servers and the analysis server 102 at least in part automatically determines a reputation score for a sender (e.g., network/Internet domain, email address, etc.) at least in part by using machine learning to analyze messages from the sender that have been received at one or more recipient message servers. In some embodiments, a reputation of a sender may be specifically determined for each particular message recipient (e.g., specific for all recipients of a particular domain, particular for an individual recipient, etc.). For example, a measure of reputation for a sender may be different for each different message recipient based on whether the recipient has had a prior communication relationship with the sender.

In some embodiments, the risk analysis performed by recipient message server 106 results in a risk value corresponding to the combination of the authenticity and reputation measures of the message. The risk value may be utilized at least in part to flag/label the message and/or to determine whether to allow the message to be delivered to an intended recipient of the message.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
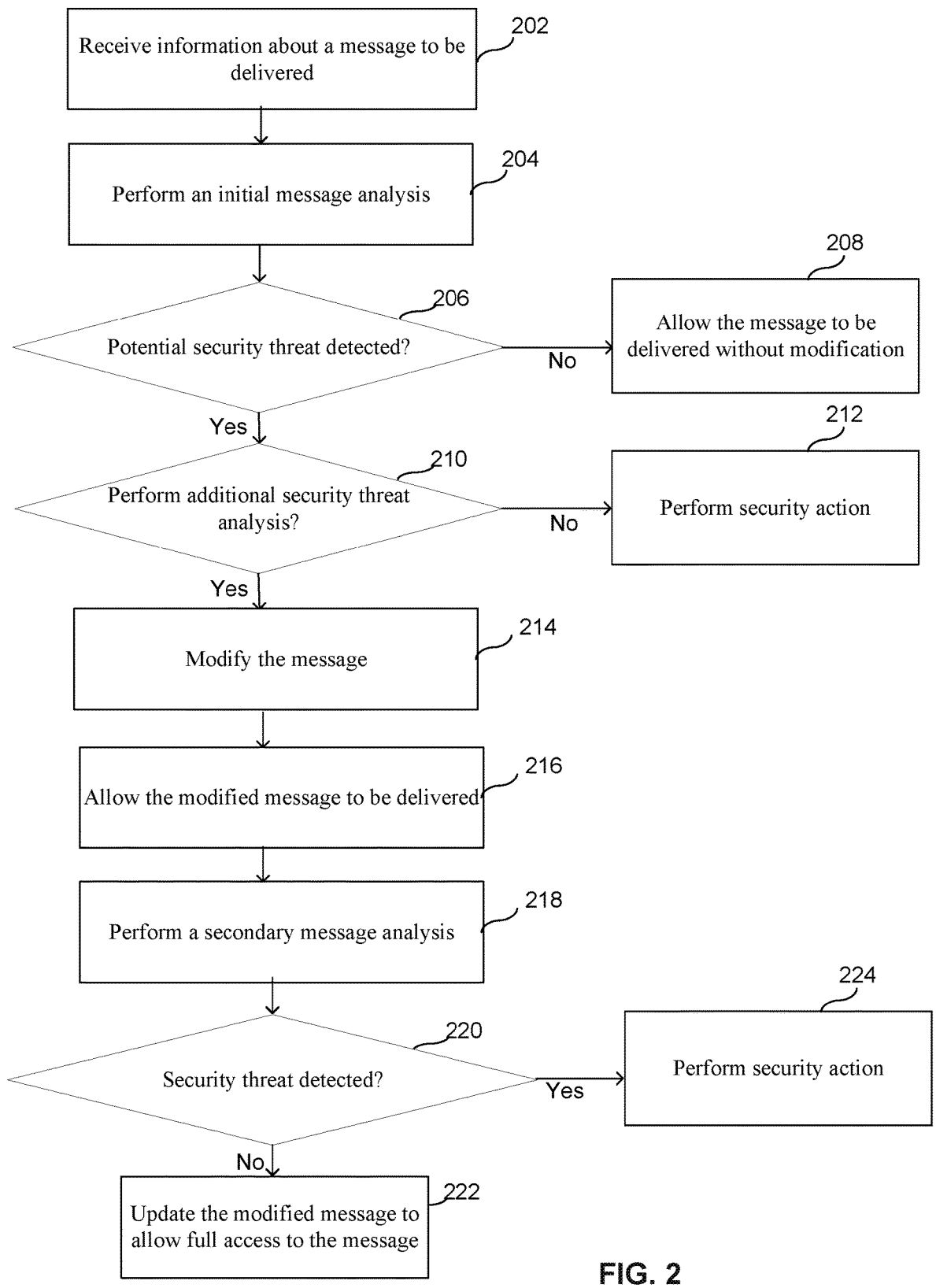
FIG. 2 is a flowchart illustrating an embodiment of a process for performing multiple levels of analysis of an electronic message.

FIG. 2 is a flowchart illustrating an embodiment of a process for performing multiple levels of analysis of an electronic message. The process of FIG. 2 may be at least in part implemented on analysis server 102, gateway 110, and/or message server 106 of FIG. 1.

At 202, information about a message to be delivered is received. In some embodiments, the information is received at analysis server 102 of FIG. 1. The information may include information included in or related to the message. For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 204, the information about the message is analyzed to perform an initial analysis. In some embodiments, the initial analysis is designed to be performed and completed quickly to be able to quickly separate safe messages and messages that require further analysis before allowing a recipient to have full access to the message. This allows safe messages to be delivered quickly to the intendent recipient while allowing potentially malicious messages to be identified for further analysis. In some embodiments, analyzing the message includes determining whether the message includes an attachment, a macro, and/or a hyperlink to an unknown or untrusted content (e.g., determine whether content of a URL was previously analyzed, domain of the hyperlink was registered recently within a threshold number of days, hyperlinked content includes a scrip, etc.). In some embodiments, analyzing the message includes determining whether the sender of the message is a trusted sender (e.g., sender is in a list of trusted contacts for the intended recipient) or sent by a trusted sender using a known (e.g., previously utilized by the sender) mail user agent (MUA). In some embodiments, analyzing the message includes determining whether the sender from a domain with a Domain-based Message Authentication, Reporting and Conformance (DMARC) policy passes Sender Policy Framework (SPF) and Domain-Keys Identified Mail (DKIM) Validations.

In some embodiments, performing the initial analysis includes analyzing the information to calculate one or more scores that are utilized to filter the message. For example, one or more scores associated with one or more of the following are determined: trust, reputation, authenticity, and risk.

In some embodiments, a trust score indicates the closeness of the relationship between the apparent sender and the recipient. This can either be a binary predicate or a real number. In a slightly simplified example, the trust score can be set to 1 if each of the two parties has sent the other at least three messages over a course of no shorter than one month; and otherwise to 0. In another example, the trust score can be a function of the number of messages received by the recipient organization sent by the sender's organization and the number of messages that have been identified as undesirable—whether by the classifier or a recipient.

In some embodiments, a reputation score of the message identifies the extent to which the system recognizes the sender based on historical traffic; as such, it is not limited to the history of the recipient or her organization. For example, a message from a sender with a very brief history would receive a low reputation score, especially if the communication pattern is similar to that of previously identified malicious senders. A message with a longer history and low traffic volume (but very few or no complaints of past abuse) would have a higher score, and a message with a long history, high volume, and few or no complaints would correspond to an even higher reputation score.

In some embodiments, an authenticity score of the message is computed by analyzing the headers, determining whether the originating server is associated with an IP address that has been previously utilized by a sender of the message. The authenticity of the message also depends on whether it has a valid digital signature.

In some embodiments, a risk score associated with a message is a heuristically computed score that depends on the sender (e.g., whether the sender has a DMARC reject policy); whether the message exhibits indications of account-take over (a collection of methods for doing this will be described in more detail below); and whether the message contents match a high-risk pattern (e.g., contains a URL associated with a site that is not trusted, contains a potentially executable attachment, or contains keywords associated with high risk.)

At 206, based on a result of the initial analysis, it is determined whether a potential security threat has been detected for the message. For example, it is determined whether a sufficient potential security threat has been detected for the message. If one or more properties indicative of a potential security threat have not been detected during the initial analysis, it is determined that a potential security threat has not been detected. For example, it is determined that a potential security threat has been detected for the message if it is determined that an attachment, a macro, and/or a hyperlink to an unknown or untrusted content is not included in the message, the sender of the message is a trusted sender that sent the message using a known MUA for the sender, and/or it is determined that the sender from a domain with a DMARC policy passes SPF and DKIM validations. In some embodiments, if one or more properties indicative of a potential security threat have been detected during the initial analysis, it is determined that a potential security threat has been detected.

In some embodiments, the determination of whether a potential security threat has been detected for the message is based on one or more score results determined during the initial analysis. For example, it is determined that a potential security threat has not been detected for the message if a determined authenticity score is above a first threshold value, a determined risk score is below a second threshold value, and either a determined trust score is above a third threshold value or a determined reputation score is above a fourth threshold value. Otherwise, in this example, it is determined that a potential security threat has been detected for the message.

If at 206 it is determined that a potential security threat has not been detected for the message, at 208 the message is allowed to be delivered without modification. For example, the message is allowed to be delivered to an inbox of an intended recipient of the message and the recipient is allowed full access to the contents of the message.

If at 206 it is determined that a potential security threat has been detected, at 210 it is determined whether a secondary level of security threat analysis of the message should be performed. For example, if a result of the initial analysis is sufficient to conclude that a security threat has been detected for the message, it is determined that additional security threat analysis of the message does not need to be performed. However, if additional analysis is required to more conclusively determine that a security threat has been detected for the message, the secondary level of security threat analysis is to be performed. For example, if a known virus, malware or attack has been detected in the message, it is determined that additional security threat analysis of the message does not need to be performed.

In some embodiments, the determination of whether a secondary level of security threat analysis of the message should be performed is based on one or more score results determined during the initial analysis. For example, it is determined that a secondary level of security threat analysis of the message does not need to be performed if it is detected that: a determined trust score is above a corresponding threshold value but a determined authenticity score is below a corresponding threshold value; a determined reputation score is above a corresponding threshold value but a determined authenticity score is below a corresponding threshold value; a determined trust score is below a corresponding threshold value and a determined reputation score is below a corresponding threshold value; or a determined risk score is above a corresponding threshold value. Otherwise in this example, it is determined that a secondary level of security threat analysis of the message should be performed. An example intuition behind these threshold criteria is that a high trust score and a low authenticity score is indicative of messages in which an attacker impersonates a party with which the recipient (or her organization) has a working relationship. On the other hand, a high reputation score and a low authenticity score is common for attacks in which well-known brands are impersonated, where the recipient does not necessarily have a relationship with these brands. Very low trust and reputation scores correspond to "fly-by-night" operations and these are commonly used for large-volume attacks. Ransomware attacks and well-established business email compromise (BEC) attacks would typically exhibit high risk scores.

If at 210 it is determined that a secondary level of security threat analysis of the message does not need be performed, the process proceeds to 212 where a security action is performed. For example, in 212 the message is blocked from being delivered and the message is forwarded/reported for further security analysis by a computer security administrator. In another example, the message is modified to remove or neutralize the security threat in a similar manner as the modifications made in 214 before allowing a recipient to access the modified version of the message. In some embodiments, the recipient is notified that the message has been blocked, modified, and/or is a security threat.

If at 210 it is determined that a secondary level of security threat analysis of the message does need be performed, at 214 the message is modified. For example, instead of removing potentially dangerous messages until they have been completely scrutinized, the messages are to be modified and made available to the recipient while additional analysis is performed. In various embodiments, modifying the message includes modifying one or more of the following associated with the message: a message sender display name, a message subject, a message body, an attachment name, and an attachment content. One example of a modification is a warning identifying to the recipient that the message is potentially high-risk. This type of warning can be added to the message in the message body, e.g., by adding a text warning or a jpg image with a warning, a message subject, a message attachment name, a message attachment content, and/or a message sender identification. The image may be referenced in the message but not included in the message, requiring the recipient to tap on a button to load it. At that point, a dynamically generated image can be served, describing the progress of the evaluation, what the potential risk factors are, and when the evaluation is expected to conclude. Another example of modification is a modification of contents, including attachments, hyperlinks, and apparent phone numbers or email addresses. These can be disabled or require specific user action to access. After the secondary analysis review of the message has been completed, they can be enabled again.

For example, consider a potentially risky email message that contains a text component, a URL and an attachment, and which has an associated sender profile. Assume that this message is identified as potentially risky by the system. The system then replaces the URL with a proxy URL, changes the extension of the attachment to make it not possible to execute, and adds a warning clarifying that the message comes from a stranger with a name that is similar to a party that is considered trusted to the recipient. This modified email is delivered to the recipient. Later, if the secondary analysis concludes that the content located at the URL is safe, the replacement proxy URL of the delivered message may be made to automatically forward to the original URL, thereby enabling the original functionality of the URL. Had the recipient clicked on the hyperlink before the secondary analysis was complete, the recipient would have visited a proxy site that may provide a security warning. Then in some embodiments, the recipient is not allowed to access the original contents of the URL until the secondary review is complete or in other embodiments, allow the recipient to access the contents after the security warning. Alternatively, the proxy site may have required the recipient to perform a user action in which the recipient reviews a warning and indicates why the recipient thinks the content is safe, e.g., it was sent by an old friend, a trusted colleague, etc. The system may determine that this is not a safe user classification if the email appears to come from a trusted colleague but does not, but instead comes from an untrusted party of the same name. If the recipient makes a selection indicating that the recipient has been deceived, the system blocks access to the content or displays additional warnings; otherwise the content is provided to the recipient. However, if the URL has been considered safe by the time the recipient clicks on the hyperlink, the proxy automatically forwards the user to the original URL.

If the recipient tries to access the attachment of the modified message before the secondary analysis has completed, in some embodiments, the real attachment would not be opened, but a warning provided or an alternative representation of the original attachment opened instead. For example, the original attachment may contain a macro, which is disabled in the modified email, allowing the user to access the attachment without the macro until after the secondary analysis has completed. If the secondary analysis completes and indicates that there is no risk or very limited risk, then the message may be replaced with a similar message in which the original attachment is contained. If the secondary review indicates significant danger, then the message may be deleted/removed from access by the recipient, made subject to further modifications, or moved to a separate folder. In addition, content associated with danger may then be replaced or removed. If a proxy has been set up for a hyperlink, then this proxy may contain a warning but no longer allow the user to access the original content. If the message contains an attachment, then this attachment may be removed or replaced with an image of the attachment or a warning.

If after careful scrutiny it is determined that a potentially risky message is not risky then the message can be replaced with the original message or a message that is similar to the original but to which a notification has been added. This notification may state that the message passed the scrutiny.

The benefit of this approach is that suspect messages are made visible to recipients, while at the same time being modified to protect the recipient. These modifications can be altered as the message is scrutinized. The modifications therefore comprise a form of quarantine. However, one that balances the needs of the user to see incoming messages is needed. Therefore, this strikes a balance between the inconvenience of false positives of the initial security assessment and the danger of false negatives of the initial security assessment. This initial security assessment can be made very coarse, and as a result, very fast. For example, in one embodiment, all messages that do not come from a trusted sender are considered potentially risky, and modified. Some of these will be very quickly analyzed and the system will conclude that they are safe, allowing the system to revert the messages to the originals; some will be very quickly analyzed and the system will conclude that they are too risky to deliver. These messages will be removed from the inbox of the user. Other messages will take much longer to analyze, and they will be represented by the modified messages until this review has concluded. Once concluded, the messages may be rewritten, removed, or otherwise processed in accordance with the security classification. As a result, it is possible to deliver all messages instantaneously or near-instantaneously, while at the same time protecting users by integrating warnings or other user experience features used to identify or communicate risk. This addresses the problem of potentially slow security classifications without causing user frustration.

In some embodiments, the modification of the message is based at least in part on a result of the initial analysis. For example, a message that is identified in the initial analysis as being at a higher than a threshold risk of being spoofed can be modified by rewriting the display name associated with the email with a subtle warning display name (e.g., replacing "Pat Peterson" with "Claims to be Pat Peterson") and by inclusion of a warning in the content of the message (e.g., including warning that "This email has been identified as potentially being forged, and is currently being scrutinized in further detail. This will take no more than 30 minutes. If you need to respond to the message before the scrutiny has completed, please proceed with caution."). In addition, any potential reply-to address can be rewritten by the system, e.g., by a string that is not an email address but which acts as a warning (e.g., "You cannot respond to this email until the scrutiny has completed. If you know that this email is legitimate, please ask the sender to confirm its legitimacy by responding to the automatically generated validation message he/she has received. You will then be able to reply." In another example, if it is detected that a display name of an email message is suspicious, the display name of the message is modified to include a warning (e.g., "This sender has a similar name to somebody you have interacted with in the past, but may not be the same person"). Alternatively, the recipient can be challenged to classify the source of the email in order to identify situations in which the recipient believes an email comes from a trusted party, but actually does not.

Account Take-Overs (ATOS) are often used by attackers to send requests, instructions, and attachments to parties who have a trust relationship with the user whose account was compromised. In another example, when a message is suspected of being the result of an ATO based on the initial analysis, any URL included in the message is modified with a replacement URL that points to a proxy content instead. This allows the system to alert the user of risk and to block access via the proxy content. Attachments can be secured in a similar way (e.g., by replacing the attachment with an attachment or link of a proxy webpage that, when loaded, provides the recipient with a warning prior to allowing access to the attachment). Text that is considered high-risk can be partially redacted or augmented with warnings, such as instructions to verify the validity of the message in person, by phone, or SMS before acting on it.

In addition, messages with an undetermined security posture can be augmented by control of access to associated material—whether websites, attachments, or aspects of attachments (such as a macro for an excel file). A message with an undetermined security posture can also be visually modified, e.g., by changing the background color of the text.

In some embodiments, the modification of the message is based on a risk profile associated with the intended recipient of the message. Consider three users belonging to the same organization. The first user is exposed to a large amount of dangerous email due to having a public profile within the organization, and many of the emails sent to her attempt to trick her to install trojans or to steal her login credentials. The second user is not exposed to a lot of attacks, but reacts to emails very quickly by clicking on URLs, opening attachments, and by responding to them regardless of whether the emails are identified as secure or not. A third person is not exposed to many attacks and is not reacting in a risky manner. It is identified that the three users are exposed to different types of risk. The first user, correspondingly, is protected by screening for traffic that is deceptive, e.g., that comes from untrusted entities that are named in a way that is similar to trusted entities; when emails arrive from such an entity, the emails are modified/quarantined (e.g., as previously described) or blocked. The second person is protected in a slightly different way: any email from an untrusted party, whether the name matches a trusted party or not, is made secure, e.g., by modification. For the third person, a less invasive protection can be used, in which only email associated with sufficient risk is modified/quarantined. For example, if an email has an attachment that is executable, and it does not come from a trusted entity who has previously sent emails to the third person containing attachments of a similar type, then the email is modified by inserting a warning. The personalized treatment is adaptive—as a user performs an action that is indicative of greater or lesser risk, the user's risk classification is updated. If, as a result, the risk classification of a user changes from one class to another, then email sent to the user will be processed in a different way onwards.

In some embodiments, the network access of users may also be restricted for users in high-risk classes. The treatment can also be made dependent on other users: a high risk user is not allowed to open an attachment until a low-risk user having been sent the same email or the same attachment first opens it. The user risk profile-based security protection also applies to other actions: e.g., a high-risk user replying to an email may have the response being temporarily quarantined while the system determines the risk score associated with the addressee of the response, and the response may be blocked, bounced, or modified as a result of the risk score. One modification is the removal of files or data that matches a profile of sensitive data. This would be performed conditional on the risk score associated with the addressee, meaning that sensitive attachments may be allowed to be sent to addressees that are considered trusted, but not to others. The determination of the class to which a user belongs is determined based on the user's historical exposure to attacks; the role of the user within the organization, and the associated exposure of this role; the actions of the user related to known good email, known bad email, and email whose risk is not known; and tests aimed at determining the security posture of the user, such as phishing knowledge tests.

At 216, the modified message is allowed to be delivered. For example, the modified message is allowed to be in an email inbox (or other email categorization folder to be actively accessed by a user to obtain new messages, e.g., not a spam or trash folder) of an end recipient. Allowing the modified message to be delivered includes allowing an intended user recipient of the message to be able to access content of the modified message. In some embodiments, allowing the modified message to be delivered includes sending an instruction that authorizes a delivery process/system to deliver the modified message. In various embodiments, because the message has been already neutralized with modification, the modified message is able to be delivered in a same manner as other messages not identified as a potential security threat (e.g., able to be delivered to the same inbox or destination where other messages that do not pose security threats are also located).

At 218, a secondary analysis of the message is performed. For example, actions/tests performed during the secondary analysis is based on the outcome of the initial analysis, and may involve in-depth database lookups, automated messaging to the apparent sender, etc. The actions/tests performed during the secondary analysis may have been too computationally expensive or taken too long to perform during the initial analysis (e.g., perform in-depth anti-virus and malware tests). Because a modified version of the message has been already delivered, the secondary analysis of the message can be delayed until an opportune time. For example, if it is detected that a processing resource is currently overloaded or costly (e.g., utilization above a threshold load), the secondary analysis of the message is held and not performed until it is detected that utilization of the processing resource has been reduced (e.g., utilization is below the threshold load). In another example, the secondary analysis of the message is held and not performed until a specified time period that generally corresponds with low or inexpensive processing resource utilization (e.g., secondary analysis is only performed at certain times of the day when processing resource utilization is low). This allows computationally expensive secondary analysis to be time shifted to reduce its impact on the processing system and/or cost (e.g., cloud computing may cost more during certain times of the day or when load exceeds a threshold).

In some embodiments, performing the secondary analysis includes determining one or more updated scores. For example, one or more updated scores associated with one or more of the following are determined: trust, reputation, authenticity, and risk.

While DMARC deployment is on the rise, there is far from universal deployment of this de-factor standard. As a result, email spoofing is still a reality organizations have to deal with. Roughly half of all attempts to pose as somebody else involves spoofing. In some embodiments, for a message that the initial analysis identifies as having a low authenticity score, automated secondary analysis can be performed to identify senders that are particularly vulnerable to spoofing attacks, as DMARC records are publicly available. This corresponds to email from senders whose organizations do not have a DMARC reject policy in place. Messages that are at high risk of having been spoofed can be validated by generating an automated message for the apparent sender, requesting a confirmation that he or she sent the message. If an affirmative reaction to this message is observed/received, it is concluded in 220 that the security threat has been confirmed, and if a negative reaction is received, it is concluded in 220 that the security threat is not confirmed. Heuristics can be used to classify messages resulting in no response after a set time has elapsed; for example, a message with a reply-to address not previously associated with the sender, or containing high-risk content, could be classified as spoofed (i.e., confirming the security threat) if there is no affirmative reaction within ten minutes of the transmission of the automated validation request.

In some cases, the initial analysis may indicate a higher than normal risk for impersonation. Consider, for example, an email is received from a sender that is neither trusted by the recipient or her organization, nor has a good reputation in general, but for which the display name is similar to the display name of a trusted party or a party with high reputation. This, by itself, is not a guarantee that the email is malicious, of course. Therefore, additional scrutiny of the message is beneficial during the secondary analysis. The automated secondary analysis can be used to identify some common benevolent and malicious cases. One common benevolent case involves a sender for which the display name and user name match, and where the sender's domain is one for which account creation is controlled. A common malevolent case corresponds to a newly created domain, and especially if the domain is similar to the domain of the trusted user to which the sender's display name is similar. There are additional heuristic rules that are useful to identify likely benevolent and malevolent cases. However, a large portion of display names and user names do not match any of these common cases—whether the message is good or bad—for these, manual review of the message contents can be used to help make a determination. Another helpful approach is to automatically send an automated request to the trusted party whose name matches the sender's name, asking to confirm whether the email from the new identity was sent by him or her. For example, the request may say "Recently, <recipient> received an email from a sender with a similar name to yours. If you just sent that email, please click on the link below and copy in the subject line of the email and click submit. Doing this will cause your email to be immediately delivered, and fast-track the delivery of future emails sent from the account."

In some cases, the initial analysis may indicate a higher than normal risk for an account take-over of the account of the sender. For example, one such indication is an email with high trust, authenticity and risk scores—this is an email likely to be sent from the account of a trusted party, but whose content indicates potential danger. If the source of potential danger is an attachment then this can be scrutinized, including both an anti-virus scan and processing of potential text contents of the attachment to identify high-risk storylines. Similarly, a suspect URL can be analyzed by automatically visiting the site and determining whether it causes automated software downloads, or has a structure indicative of a phishing webpage. Additional indications of risk may be identified by determining if the sender of the suspect email is associated with a recent traffic anomaly, if the sender has communication relationships with a large number of users protected by the system, and an unusual number of these received emails from the sender in the recent past, then this increases the probability of an account takeover having taken place.

At 220, based on a result of the secondary analysis, it is determined whether a security threat has been detected. For example, if a test, inquiry, and/or data performed or accessed during the secondary analysis indicates that a security threat has been detected for the message, the process proceeds to 224. If none of the tests, inquiries, and/or data performed or accessed during the secondary analysis indicates that a security threat has been detected for the message, the process proceeds to 222. In some embodiments, if one or more properties indicative of a security threat have been detected or confirmed during the secondary analysis, it is determined that a security threat has been detected.

In some embodiments, the determination of whether a security threat has been detected for the message is based on one or more score results determined during the secondary analysis. For example, the determination is made based on comparisons of scores with corresponding thresholds. In one example, it is determined that a security threat has not been detected for the message if an updated authenticity score is above a first threshold value, an updated risk score is below a second threshold value, and either an updated trust score is above a third threshold value or an updated reputation score is above a fourth threshold value. Otherwise in this example, it is determined that a security threat has been detected for the message. In another example, if a cumulative risk score determined during the secondary analysis is below a threshold it is determined that a security threat has not been detected for the message and if the cumulative risk score is above the threshold it is determined that a security threat has been detected for the message.

If at 220, it is determined that a security threat has been detected, at 224, a security action is performed. The security action may include revoking access to the message, deleting the message, forwarding the message, reporting the message, further modifying the message, moving the message (e.g., to a different folder), preventing access to an attachment of the message, preventing access to content referenced by a URL included in the message, providing an additional warning, and/or performing further analysis.

If at 220, it is determined that a security threat has not been detected, at 222, the modified message is updated to allow full access to the message. Updating the modified message may include directly modifying a stored copy of the modified message accessed by the recipient, sending a copy of the full message to the recipient (e.g., as a reply message to the modified message received by the recipient), removing an earlier made modification to the message, or modifying a target of a proxy URL included in the modified message to point to corresponding unrestricted content of the message. For example, the original attachment may contain a macro, which is disabled in the modified email, allowing the user to access the attachment without the macro until after the secondary analysis has completed. If the secondary analysis completes and indicates that there is no risk or very limited risk, then the message may be replaced with a full message in which the original attachment is contained. In some embodiments, the updated message may include a notification that the message passed security analysis. In various embodiments, updating the modified message includes performing one or more of the following: moving the modified message from a message inbox to another message folder; removing the modified message from a message inbox; modifying, removing or replacing at least one message attachment; modifying, removing or replacing at least one content location identifier (e.g., URL); and modifying, removing or replacing at least one contact identifier (e.g., a phone number, a messaging handle, an email address, a street address, a user name, etc.); and not allowing an intended recipient of the message to fully access the message.

Figure 3:
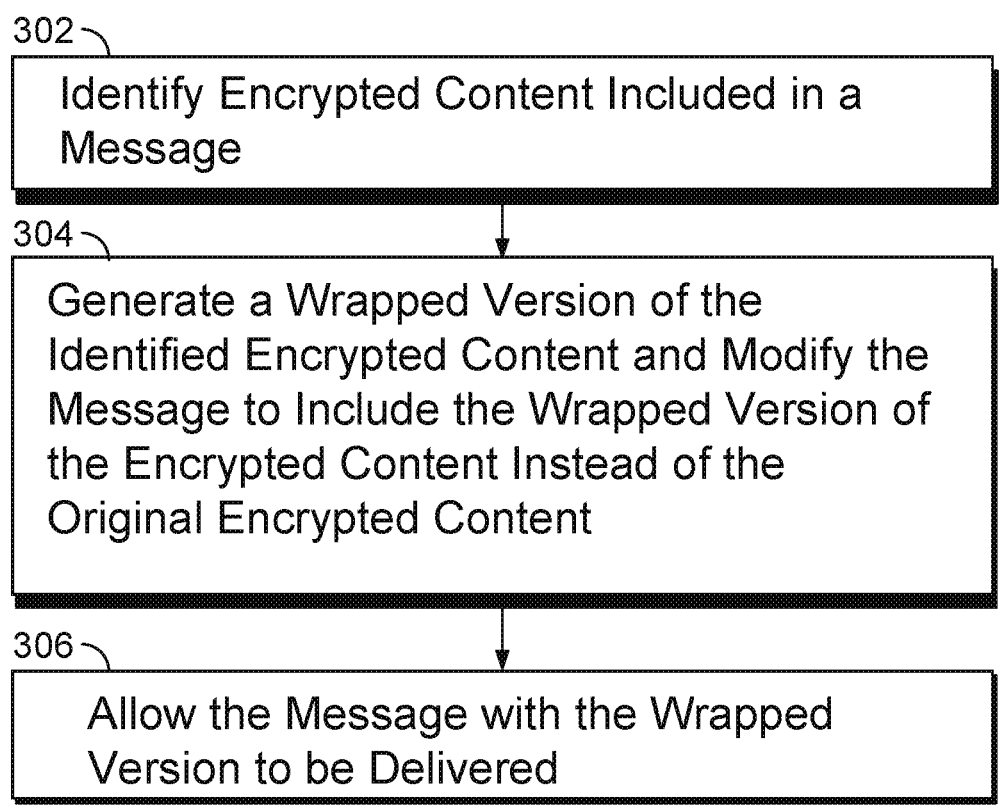
FIG. 3 is a flowchart illustrating an embodiment of a process for wrapping encrypted content of the message.

FIG. 3 is a flowchart illustrating an embodiment of a process for wrapping encrypted content of the message. The process of FIG. 3 may be at least in part implemented on analysis server 102, gateway 110, and/or message server 106 of FIG. 1. In various embodiments, at least a portion of the process of FIG. 3 is performed in the process of FIG. 2. For example, 304 is performed in 214 of FIG. 2.

If a message includes encrypted content such as an encrypted email attachment, that encrypted content is often unable to be properly analyzed for security threats because analysis tools are unable to access the encrypted content. Hackers may take advantage of this by sending an encrypted malware attachment along with a password to be utilized by the recipient to open the attachment.

At 302, encrypted content included in a message is identified. Examples of the message include an email, instant message, a chat message, and any other forms of electronic messages. The message may be analyzed as a part of a computer security analysis and filtered to identify and neutralize security threats prior to allowing an intended recipient of the message to access the message. In some embodiments, each message received for delivery to its intended recipient associated with the system performing analysis of the message is to be analyzed. Examples of the encrypted content include: an encrypted executable file, an encrypted zip file, an encrypted text, an encrypted script, an encrypted image, and any other encrypted content. The encrypted content may have been identified by identifying content that requires a password to access it.

At 304, a wrapped version of the identified encrypted content is generated and the message is modified to include the wrapped version of the encrypted content instead of the original encrypted content. In some embodiments, wrapping the encrypted content includes embedding the encrypted content in an executable program. When the executable program is executed, the executable program requests a decryption password from the user and the encrypted content of the message is encrypted using the decryption password and the decrypted content is analyzed for security threats prior to allowing the user access to the decrypted content once the analysis has completed without identifying a security threat. If the security analysis identifies a threat, a user may not be allowed to access the decrypted content and the security threat may be logged or reported to an administrator.

For example, the wrapped version of an encrypted zip file is a file that, when opened, causes execution, whether of the file wrapper itself or of an associated application that the message recipient needs to download, and as the file wrapper is executed, it requests and receives a decryption key, PIN, or password from the user and uses the PIN or password to decrypt the wrapped zip file. This is done by executing the unzip program associated with the zip file, or a compatible version to this, providing the unzip program with the PIN or password provided by the user. It then automatically accesses the contents of the unzipped file and analyzes it for security risks. This can be done in a multiplicity of ways, including detonating each file, determining whether any of the files match an anti-virus signature, determining whether any of the files has executable code segments in it, etc. The same approach also works for messages with attachments that are encrypted pdfs, or any other encrypted file. In such cases, the execution of the wrapper file causes the decryption of the encrypted file, which is then analyzed for security risks, including executable code. If a file, independent of type, passes the verification, then the decrypted content is made available to the recipient. Thus, the user experience associated with the opening of wrapped encrypted content would be the same as that of unwrapped encrypted content, except for a delay during security analysis (e.g., in most cases this would be too short to detect).

At 306, the message with the wrapped version of the encrypted content is allowed to be delivered. For example, the modified message is allowed to be delivered to an email inbox (or other email categorization folder to be actively accessed by a user to obtain new messages, e.g., not a spam or trash folder) of an end recipient. Allowing the modified message to be delivered includes allowing an intended user recipient of the message to be able to access the wrapped encrypted content. When the recipient opens the wrapped encrypted content, the wrapper program requests a decryption key, decrypts the encrypted content using the decryption key, and initiates the security analysis of the decrypted content prior to allowing the recipient access to the decrypted content of the encrypted content. Any security analysis technique or method described in this specification may be performed on the decrypted content to analyze it for security threats. If a security threat is detected, the user may not be allowed access to the decrypted content and a security may be performed. The security action may include revoking access to the message, deleting the message, forwarding the message, reporting the message, further modifying the message, moving the message (e.g., to a different folder), preventing access to a portion of the message, providing an additional warning, and/or performing further analysis.

Figure 4:
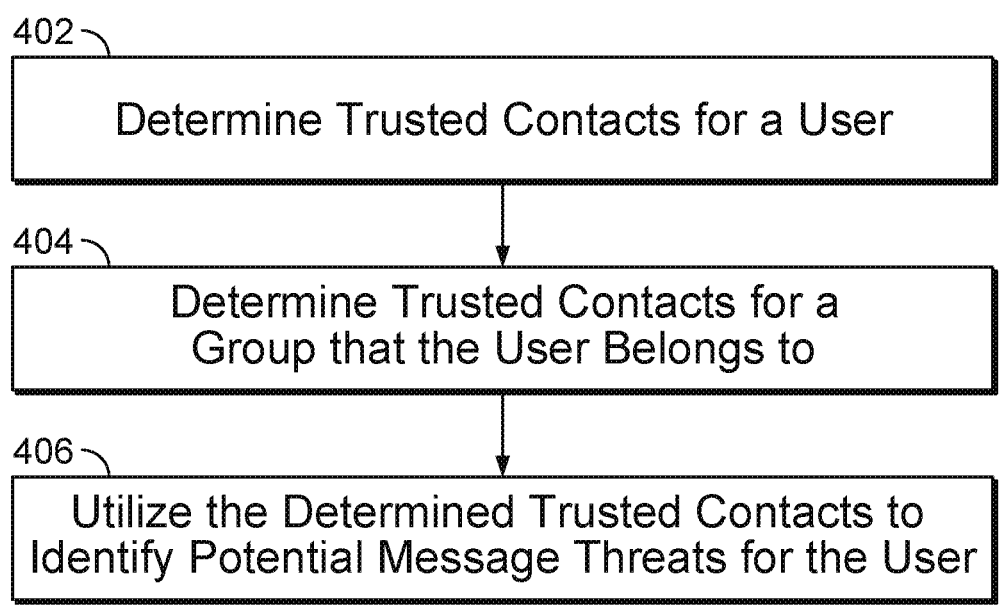
FIG. 4 is a flowchart illustrating an embodiment of a process for tracking trusted contacts.

FIG. 4 is a flowchart illustrating an embodiment of a process for tracking trusted contacts. The process of FIG. 4 may be at least in part performed by analysis server 102, gateway 110 and/or message server 106 of FIG. 1. Examples of the contacts include email addresses, usernames, display names, user identifiers, an identification photo, and any other identifier that may be utilized to identify a sender or recipient of a message. At least a portion of the process of FIG. 4 may be performed in 204 and/or 218 of FIG. 2. For example, one or more steps of the process of FIG. 4 are performed during the initial analysis and/or secondary analysis in the process of FIG. 2.

At 402, trusted contacts for a user are determined. The trusted contacts are to be utilized to identify potential message threats of the user. The trusted contacts identify one or more contacts (e.g., senders or recipients of messages) that are familiar to the user because the user has previously interacted with the contact and/or is aware of the contact. In some embodiments, determining the trusted contacts includes receiving a list of contacts for the user. For example, the user provides access to an address book of the user and information about contacts in the address book is received. In some embodiments, the trusted contacts include contacts that have been specifically identified by the user. In some embodiments, information about the trusted contacts is stored. For example, the trusted contacts for the user are stored in a database of trusted contacts. This database may track trusted contacts for a plurality of different users and allows trusted contacts to be retrieved for a specific identified user. The stored information of each contact may include one or more of the following: email address, associated name (e.g., display name), relationship identifier, identifying image (e.g., contact photo), username, instant message identifier, address, phone number, a measure of trust, a measure of message interaction, and any other identifier utilized to identify a sender or a receiver of a message.

In some embodiments, the trusted contacts for the user are at least in part determined automatically based on contacts detected in messages sent or received by the user. For example, by observing and analyzing message traffic of the user and patterns of message recipients and senders, contacts that receive messages from the user and contacts that send messages to the user can be determined and correlated to infer and determine trust, frequency, and/or importance of interaction and relationship between the user and the contact to identify one or more of these contacts as a trusted contact. In one example, if a threshold number of messages has been sent to and from a contact for a user, the contact is identified as a trusted contact and added to a stored list of trusted contacts for the user. Information about the messages of the user utilized to at least in part automatically determine the trusted contacts has been obtained for analysis by receiving at least a portion of the messages (e.g., a copy of the entire message, email addresses and names of contacts of messages, etc.) for analysis (e.g., at server 102 from server 104, gateway 110, or server 106 of FIG. 1).

At 404, trusted contacts for a group that the user belongs to are determined. For example, trusted contacts for the users included in the group are aggregated to identify patterns among the aggregated trusted contacts. Examples of the group include a network domain that the user belongs to (e.g., domain of the email address of the user), an entity/organization that the user belongs to (e.g., company that the user belongs to), a message service provider, or an authority that controls a message account of the user. In some embodiments, determining trusted contacts for the group includes aggregating information about a trusted contact and/or a network domain of one or more trusted contacts from information gathered for different users for the trusted contact and/or the network domain. In some embodiments, determining the trusted contacts for the group includes storing information about the trusted contacts in a data storage structure and associating this stored information with the group.

At 406, determined trusted contacts are utilized to identify potential message threats for the user. For example, the contacts in the trusted contacts may be utilized as a proxy for contacts that are familiar to the user and if an attacker tries to attack the user using an impersonation attack, contact being impersonated likely corresponds to one of the contacts in the list of trusted contacts of the user. By determining a measure of similarity between a sender identifier of a message received for the user with each identifier of each trusted contact, messages attempting impersonation attacks may be identified. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack and filtered. Filtering the message may include blocking the message, quarantining the message, further analyzing the message, and/or modifying the message (e.g., insert a warning).

Figure 5:
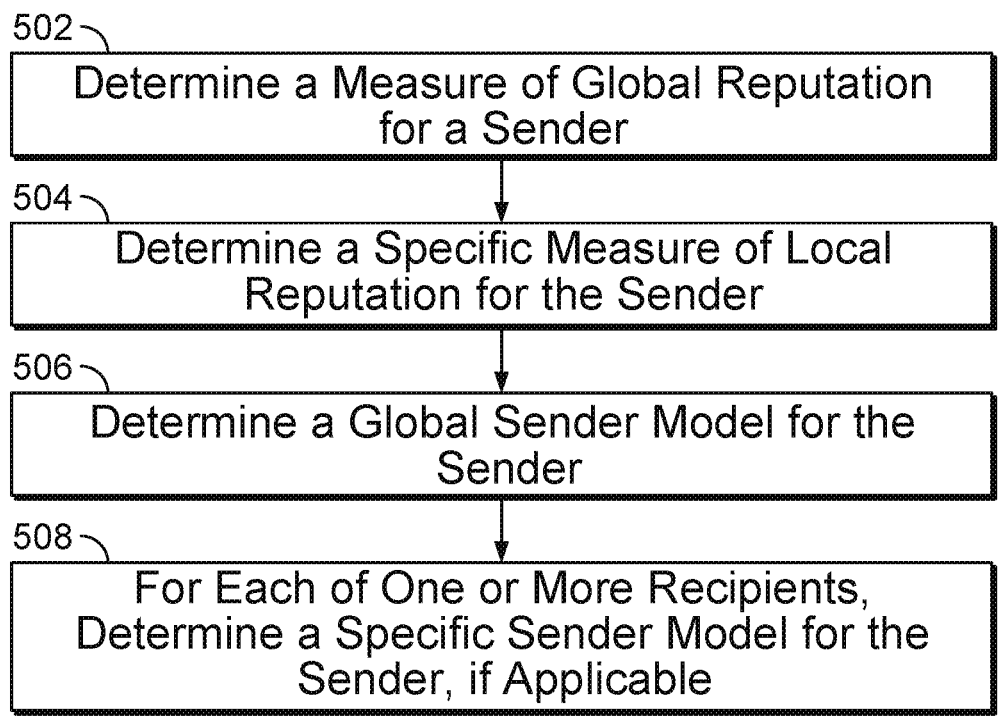
FIG. 5 is a flowchart illustrating an embodiment of a process for determining information about a message sender to be utilized to assess a risk of a message.

FIG. 5 is a flowchart illustrating an embodiment of a process for determining information about a message sender to be utilized to assess a risk of a message. The process of FIG. 5 may be at least in part implemented on analysis server 102, gateway 110, and/or message server 106 of FIG. 1. In some embodiments, at least a portion of the process of FIG. 5 is performed in 402 and/or 404 of FIG. 4. For example, the process of FIG. 5 may be repeated for each trusted contact determined for a user (e.g., for each contact in a list of trusted contacts stored in a repository) and stored in a data structure that tracks the trusted contacts. The process of FIG. 5 may be repeated periodically. At least a portion of the process of FIG. 5 may be performed in 204 and/or 218 of FIG. 2. For example, one or more steps of the process of FIG. 5 are performed during the initial analysis and/or secondary analysis in the process of FIG. 2.

At 502, a measure of global reputation for a sender is determined. The sender may correspond to a group of individual sender addresses in some embodiments or an individual sender address in other embodiments. For example, the sender corresponds to a trusted contact in a list of trusted contacts determined using the process of FIG. 4. In another example, the sender corresponds to a domain of a trusted contact identified using the process of FIG. 4. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 504) for the sender determined for each recipient of a group of different recipients to determine a combined measure (e.g., combined score).

At 504, a specific measure of local reputation for the sender is determined for each of one or more different recipients. For example, although the measure of global reputation determined in 502 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 402 of the process of FIG. 4. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 506, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 508, a specific sender model for the sender is determined for each of one or more recipients, if applicable. For example, although the sender model determined in 506 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 506 except for utilizing data specific to the recipient rather than various different recipients. For example, using a repository storing messages received from the sender to only the recipient, individual or neighborhoods of IP addresses associated with the sender model for a sender are automatically determined.

Figure 6:
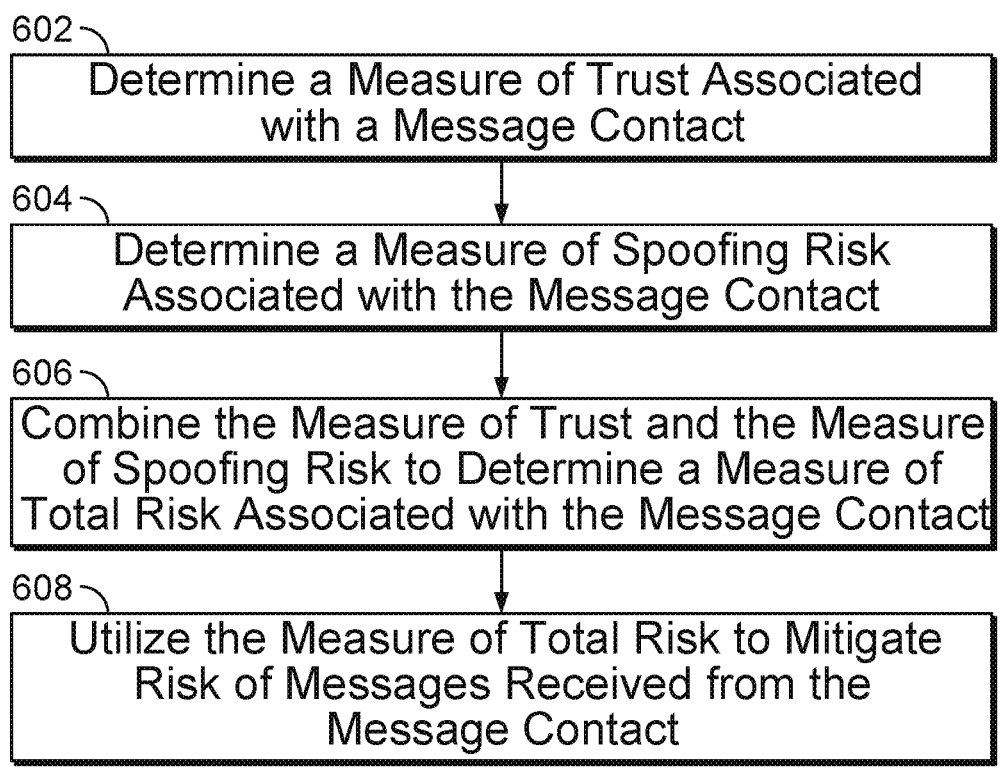
FIG. 6 is a flowchart illustrating an embodiment of a process for determining a total risk measure of a contact.

FIG. 6 is a flowchart illustrating an embodiment of a process for determining a total risk measure of a contact. The process of FIG. 6 may be at least in part implemented on analysis server 102, gateway 110, and/or message server 106 of FIG. 1. At least a portion of the process of FIG. 6 may be performed in 204 and/or 218 of FIG. 2. For example, one or more steps of the process of FIG. 6 are performed during the initial analysis and/or secondary analysis in the process of FIG. 2.

At 602, a measure of trust associated with a message contact is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 5. For example, the measure of trust is the specific measure of local reputation determined in 504. In another example, the measure of trust is the measure of global reputation included in the global sender model determined in 506. In another example, the measure of trust is determined based on a combination (e.g., average, sum, product, etc.) of the measure of global reputation and the specific measure of local reputation.

At 604, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 606, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 608, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Figure 7:
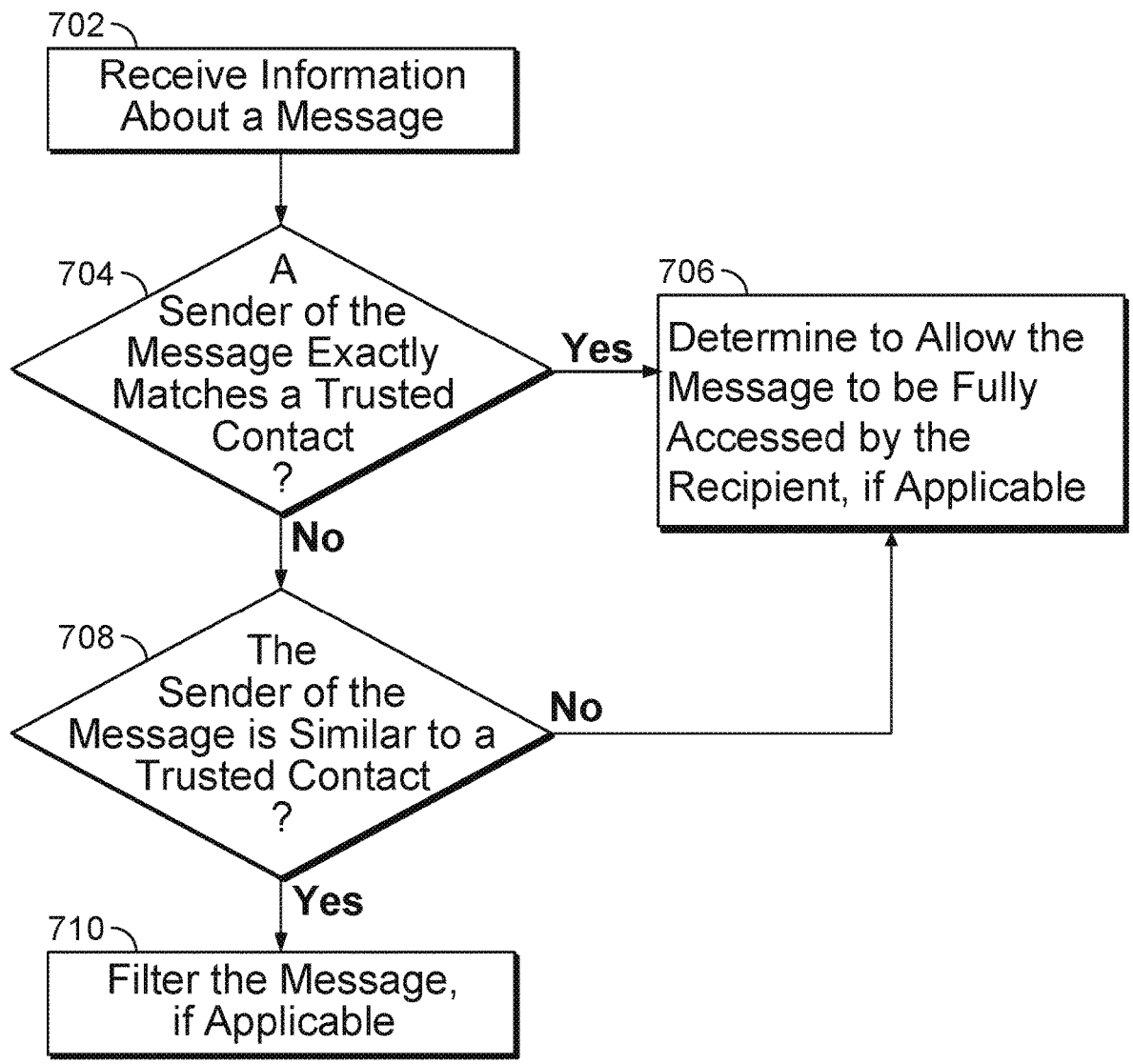
FIG. 7 is a flowchart illustrating an embodiment of a process for assessing a received message for filtering.

FIG. 7 is a flowchart illustrating an embodiment of a process for assessing a received message for filtering. The process of FIG. 7 may be at least in part implemented on analysis server 102, gateway 110, and/or message server 106 of FIG. 1. At least a portion of the process of FIG. 7 may be performed in 204 and/or 218 of FIG. 2. For example, one or more steps of the process of FIG. 7 are performed during the initial analysis and/or secondary analysis in the process of FIG. 2.

At 702, information about a message is received. In some embodiments, the information is received at analysis server 102 of FIG. 1. The information may include information about a sender of the message. For example, the information includes email address header information including an email address and a display name of the sender of the message. In some embodiments, the information about the message includes contents of the message. Examples of the message include an electronic mail (i.e., email), an instant message, a chat message, and any other forms of electronic messages.

At 704, it is determined whether a sender of the message exactly matches a trusted contact. For example, it is determined whether an address of the sender of the message (e.g., in a "From:" field of a message header) exactly matches an address of a trusted contact in a list of trusted contacts for the recipient of the message. In some embodiments, the trusted contacts include trusted contacts identified in 402 and/or 404 of FIG. 4. For example, a list of trusted contacts for the recipient of the message is obtained from storage and email addresses for each trusted contact of the list are compared with the email address of a sender of the message to identify whether there is an exact match.

If at 704 it is determined that the sender of the message exactly matches the trusted contact, at 706, it is determined to allow the message to be fully accessed by the recipient, if applicable. For example, because the sender of the message exactly matches the trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware. In some embodiments, the total risk score determined using 606 of FIG. 6 is utilized to determine whether to allow full access to the message. If a value of the measure of total risk of the sender is above a threshold value, the message is identified as a risk and the message is filtered as in 710 to reduce its risk to the recipient.

If at 704 it is determined that the sender of the message does not exactly match a trusted contact, at 708, it is determined whether the sender of the message is similar to a trusted contact. For example, by determining whether the sender of the message is similar to a trusted contact, a likelihood of confusion by a recipient of the message that the message is from a trusted contact is determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 402 and/or 404 of FIG. 4. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

In some embodiments, it is determined that the sender of the message is similar to a trusted contact if any measure of similarity (e.g., string distance measure) meets a threshold value. For example, if any string distance measure determined for a list of trusted contacts is greater than a threshold value, the message is identified as potentially an impersonation attack message and it is determined that the sender of the message is similar to the trusted contact.

In some embodiments, messages that are highly authentic (e.g., associated with a valid DMARC signature, correct SPF records, or both) but which come from domains that are associated with low control are to be subject to increased analysis. For example, a measure of control of the domain of the sender is determined. The measure of control measures how easy it is to create an account of the domain without having to pass a careful screening. For example, any user is able to create a Google Gmail account by setting the username to any available user name and setting the display name to any correctly formed display name. Thus, domains correspond to a very low degree of control by the domain owner. In contrast, the typical enterprise or government entity has high control over account creation, allowing only employees and affiliates to create accounts, where these have to satisfy some common criteria related to the real-life identity of the user. When the message is identified as having high authenticity but low domain control, then the display name is to be scrutinized (e.g., compared to trusted display names using string distance as previously discussed), whereas for domains with high control, the display name is not scrutinized (e.g., display name impersonation detection not performed).

If at 708 it is determined that the sender of the message is similar to a trusted contact, at 710, it is determined to filter the message, if applicable. Filtering the message may include modifying at least a portion of the message, affecting delivery of the message, providing a notification regarding the message, and/or performing additional analysis on the message. An example of filtering the message is performing a security action.

In some embodiments, modifying at least a portion of the message includes modifying (e.g., replacing, adding or removing/deleting) data included in a data field (of the message) that includes an identification of the sender of the message. For example, the data field that is identified to include the identification of the sender is selected from a plurality of data fields of a message header and contents of the selected data field is modified. Examples of the identification of the sender includes a display name, an email address (e.g., "from" email address), a reply-to address, a phone number, an image, a content link, or any other identifier/identification of the sender specified in the message. The data field of the message may be included in a header of the message. For example, the data field of the message is a "From:" field, a "Reply-To:" field or a "Return-Path:" field of an email message header. In some embodiments, the message is a SMS message or a MMS message and a phone number of the sender in the data field is modified. For example, the sender phone number is removed or changed to a different number. In some embodiments, modifying data included in the data field includes modifying a location identifier of content associated with the sender of the message. For example, a URL to an image of the sender is modified to reference a different image (e.g., replacement image includes a warning message).

One example filtering is quarantining the message and sending an automated message to the email address in the "From:" field of the message regarding the quarantine. The automated email may require the recipient to click on a hyperlink that is unique and not predictable to an attacker. If the system determines that such a link was clicked on (e.g., by receiving a corresponding GET request), then the email may be taken out of quarantine and delivered.

Another example filtering is sending an automated email in response to the received message (e.g., whether to the address in the from field or a potential address in the 'reply-to' field or both), requiring the recipient to click on a hyperlink where he or she has to enter a code obtained from an authenticator module, such as a SecurID token or Google authenticator app. If the entered code is correct, the message is taken out of quarantine and delivered.

In an alternative embodiment, the received message is not quarantined but delivered to its recipient after being modified. For example, a warning message is added to one or more header fields and/or the body of the message (e.g., add warning message to subject of message, add warning message to modify sender address, etc.). In some embodiments, the received message is modified to change, remove, and/or censure at least a portion of the message (e.g., remove attachment, remove hyperlinks, remove/modify reply to address, etc.).

If at 708 it is determined that the sender of the message is not similar to a trusted contact, the process returns to 706. In an alternative embodiment, if at 708, it is determined that the sender of the message is not similar to a trusted contact, the message is identified for filtering if the recipient of the message has never sent a message to the sender of the message. In some embodiments, the total risk score determined using 606 of FIG. 6 is utilized to determine whether to allow full access to the message. If a value of the measure of total risk of the sender is above a threshold value, the message is identified as a risk and the message is filtered in 710 to reduce its risk to the recipient.

Figure 8A:
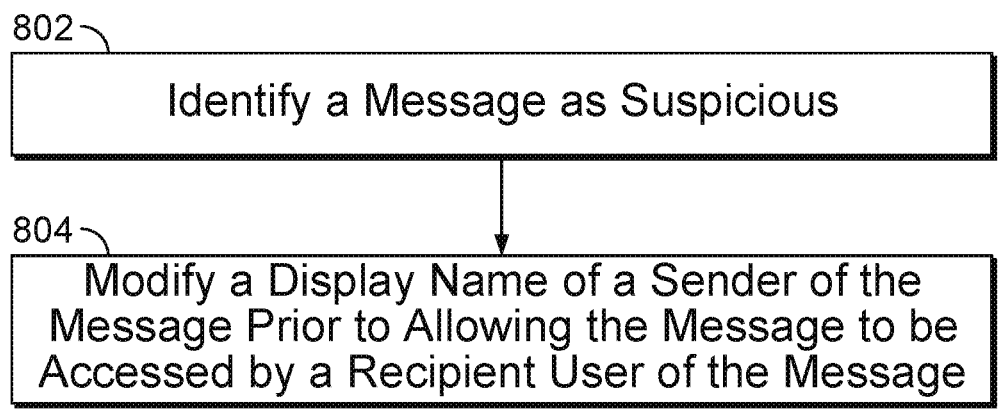
FIG. 8A is a flowchart illustrating an embodiment of a process for modifying a display name of a sender of the message.

FIG. 8A is a flowchart illustrating an embodiment of a process for modifying a display name of a sender of the message. The process of FIG. 8A may be at least in part implemented on analysis server 102, gateway 110, and/or message server 106 of FIG. 1. In some embodiments, at least a portion of the process of FIG. 8A is performed in filtering the message in 706 and/or 710 of FIG. 7. At least a portion of the process of FIG. 8A may be performed in 214, 212 and/or 224 of FIG. 2. For example, 804 of FIG. 8A is performed in 214 FIG. 2.

At 802, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 804, a display name of a sender of the message is modified prior to allowing the message to be accessed by a recipient user of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name 'Pat Peterson.'" Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name.

In some embodiments, in addition to or instead of the display name, an email address of the sender is also modified. For example, the entire "From:" field of a header of the message that includes both the display name and an email address is modified with a warning.

Figure 8B:
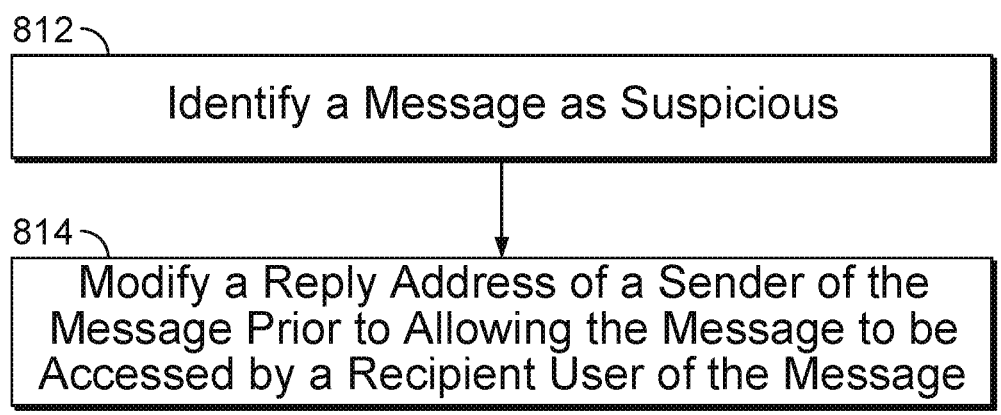
FIG. 8B is a flowchart illustrating an embodiment of a process for modifying a reply address of a sender of the message.

FIG. 8B is a flowchart illustrating an embodiment of a process for modifying a reply address of a sender of the message. The process of FIG. 8B may be at least in part implemented on analysis server 102, gateway 110, and/or message server 106 of FIG. 1. In some embodiments, at least a portion of the process of FIG. 8B is performed in filtering the message in 706 and/or 710 of FIG. 7. At least a portion of the process of FIG. 8B may be performed in 214, 212 and/or 224 of FIG. 2. For example, 814 of FIG. 8B is performed in 214 FIG. 2.

At 812, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 814, a reply address of a sender of the message is modified prior to allowing the message to be accessed by a recipient user of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email.

In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause on some message clients to bounce the email.

Figure 9:
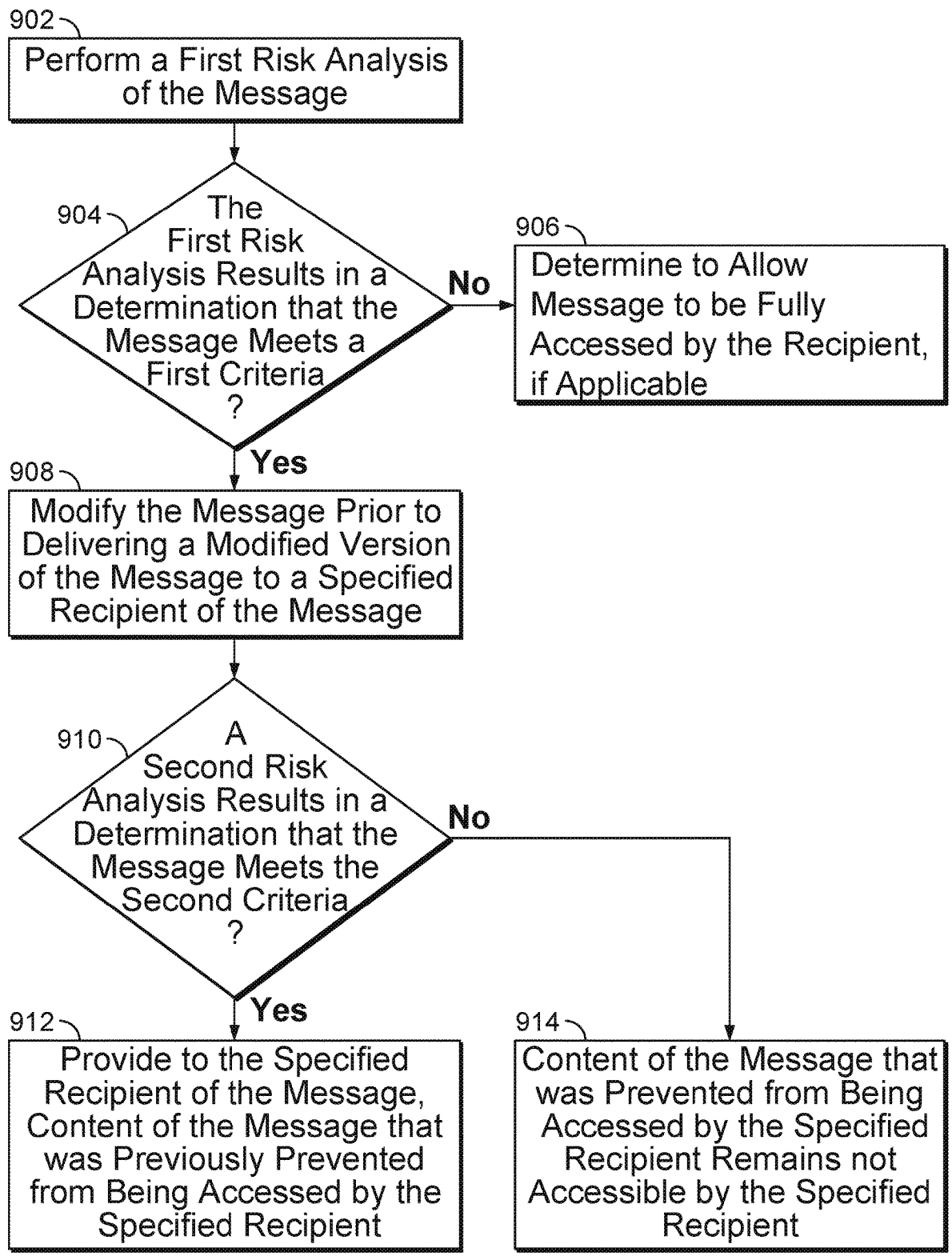
FIG. 9 is a flowchart illustrating an embodiment of a process for securing a message.

FIG. 9 is a flowchart illustrating an embodiment of a process for securing a message. The process of FIG. 9 may be at least in part implemented on analysis server 102, gateway 110, and/or message server 106 of FIG. 1. In some embodiments, at least a portion of the process of FIG. 9 is performed in filtering the message in 706 and/or 710 of FIG. 7. At least a portion of the process of FIG. 9 may be performed in the process of FIG. 2. For example, the first risk analysis of 902 is performed in the initial analysis of 204, the criteria satisfaction determination of 904 is performed in determinations of 206 and/or 210, the allowance of access in 906 is performed in the delivery allowance of 208, the message modification of 908 is performed in the message modification of 214, the second risk analysis of 910 is performed in the secondary analysis of 218, the criteria satisfaction determination of 910 is performed in the determination of 220, providing of content in 912 is performed in updating the modified message in 222, and/or content access prevention of 914 is performed in the security action of 224.

At 902, a first risk analysis of the message is performed. For example, it is determined whether the message is suspicious. In some embodiments, steps 704 and/or 706 of FIG. 7 is performed in 902. For example, it is determined whether the sender of the message is similar to a trusted contact. By determining whether the sender of the message is similar to a trusted contact, a likelihood of confusion by a recipient of the message that the message is from a trusted contact may be determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 402 and/or 404 of FIG. 4. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

At 904, it is determined whether the first risk analysis results in a determination that the message meets a first criteria. For example, it is determined whether the message meets a criteria to be deemed suspicious. In some embodiments, message meets the first criteria if a measure of similarity (e.g., string distance measure) meets a threshold value. For example, if any string distance measure determined for a list of trusted contacts (e.g., determined in 902) is greater than a threshold value, the message is identified as potentially an impersonation attack message and it is determined that the message meets the first criteria.

In some embodiments, the message meets the first criteria if a sender of the message has not previously sent a message to a recipient identified in the message. In some embodiments, the message meets the first criteria if a recipient identified in the message has not previously sent a message to the sender of the message. In some embodiments, the message meets the first criteria if a spam detector, a virus detector, and/or a malware detector has detected that the message includes a spam, virus or malware.

In some embodiments, a total risk score determined using 606 of FIG. 6 is utilized to determine whether message meets the first criteria. For example, if a value of the measure of total risk of the sender is above a threshold value, the message is identified as meeting the first criteria.

If at 904 it is determined that the message does not meet the first criteria, at 906 it is determined to allow the message to be fully accessed by the recipient, if applicable. For example, because the sender of the message exactly matches the trusted contact or sender of the message is not similar to any trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware.

If at 904 it is determined that the message does meet the first criteria, at 908 the message is modified prior to sending a modified version of the message to a specified recipient of the message. For example, a warning message is added to one or more header fields and/or the body of the message (e.g., add warning message to subject of message, add warning message to modify sender address, etc.). The first risk analysis is performed before sending the modified version of the message. Sending the modified version may include delivering the modified version to the specified recipient (e.g., deliver to a mailbox of the specified recipient on server 106 of FIG. 1).

In some embodiments, modifying at least a portion of the message includes modifying (e.g., replacing, adding or removing/deleting) data included in a data field of the message that includes an identification of the sender of the message (e.g., modify an identifier of the sender). Examples of the identification of the sender includes a display name, an email address (e.g., "from" email address), a reply-to address, or any other identifier/identification of the sender specified in the message. The data field of the message may be included a header of the message. For example, the data field that includes the identification of the sender is a "From:" field, a "Reply-To:" field or a "Return-Path:" field of an email message header. The contents of the data field may be modified to provide a warning to a recipient, prevent a potential confusion of an identity of the sender of the message by the recipient of the message and/or prevent the recipient from responding to the message or sending a message to the sender of the message.

In some embodiments, the received message is modified to change, remove, and/or censure at least a portion of a content of the message (e.g., remove attachment, remove hyperlinks, remove a portion of the message content beyond a selected beginning body portion, etc.). For example, a message body section of an email message is modified to censure at least a portion of a content of the email message. In some embodiments, modifying the message includes inserting an inquiry associated with a verification of the sender of the message, wherein the inquiry requests a user response.

At 910, a second risk analysis of the message is performed and it is determined whether the second risk analysis results in a determination that the message meets the second criteria. In some embodiments, the modified version of the message is sent to the specified recipient of the message (e.g., sent to a mailbox of the specified recipient on server 106 of FIG. 1) prior to a conclusion of the second risk analysis. For example, the modified version of the message is sent and delivered to a mailbox of the specified recipient of the message prior to the conclusion of the second risk analysis. In some embodiments, the second risk analysis concludes upon determination of whether the second risk analysis results in a determination that the message meets the second criteria.

In some embodiments in 910, any of a plurality of different types of verification/security actions may be performed to further analyze and verify the message (e.g., verify an identity of the sender of the message). For example, it is determined whether a classification of the sender of the message requested and received from the specified recipient of the message matches an automatically identified classification of the sender, and it is determined the message meets the second criteria if a user response to the requested classification matches the automatically identified classification (e.g., see the process of FIG. 10A). In another example, an automatically generated reply message to a received message is sent the sender of the received message requesting verification of an identity of the sender of the message and it is determined the message meets the second criteria if the sender has provided a valid identity in response to the reply message (e.g., see the process of FIG. 11A).

If at 910 it is determined that the second risk analysis results in a determination that the message meets the second criteria, at 912, content of the message that was previously prevented from being accessed by the specified recipient is provided to the specified recipient of the message. The second risk analysis may be a more in-depth and/or resource intensive analysis of the message reserved for messages that fail the first risk analysis. For example, an original version of the message prior to the modification in 908 is sent to the specified recipient of the message. This original version may be a duplicate message in addition to the initially provided modified version of the message (e.g., original version delivered as a new message to the specified recipient) or this original version may be a replacement message of the initially provided modified version of the message (e.g., initially provided modified message is deleted from mailbox of the specified recipient of the message and replaced with the original version). In some embodiments, the content of the message that was previously prevented from being accessed is included a new message sent to the specified recipient of the message.

If at 910 it is determined that the second risk analysis results in a determination that the message does not meet the second criteria, at 914 content of the message that was prevented from being accessed by the specified recipient remains not accessible by the specified recipient. In some embodiments, the message is deleted or quarantined. For example, after a period of time of message not meeting the second criteria and/or if it is determined during the second risk analysis that the message is potentially hazardous to a specified recipient of the message, the message is automatically deleted or quarantined to prevent access by the specified recipient to the entire message. In some embodiments, a notification is provided to an administrator. For example, the administrator is provided a warning about the message failing the second risk analysis.

Figure 10A:
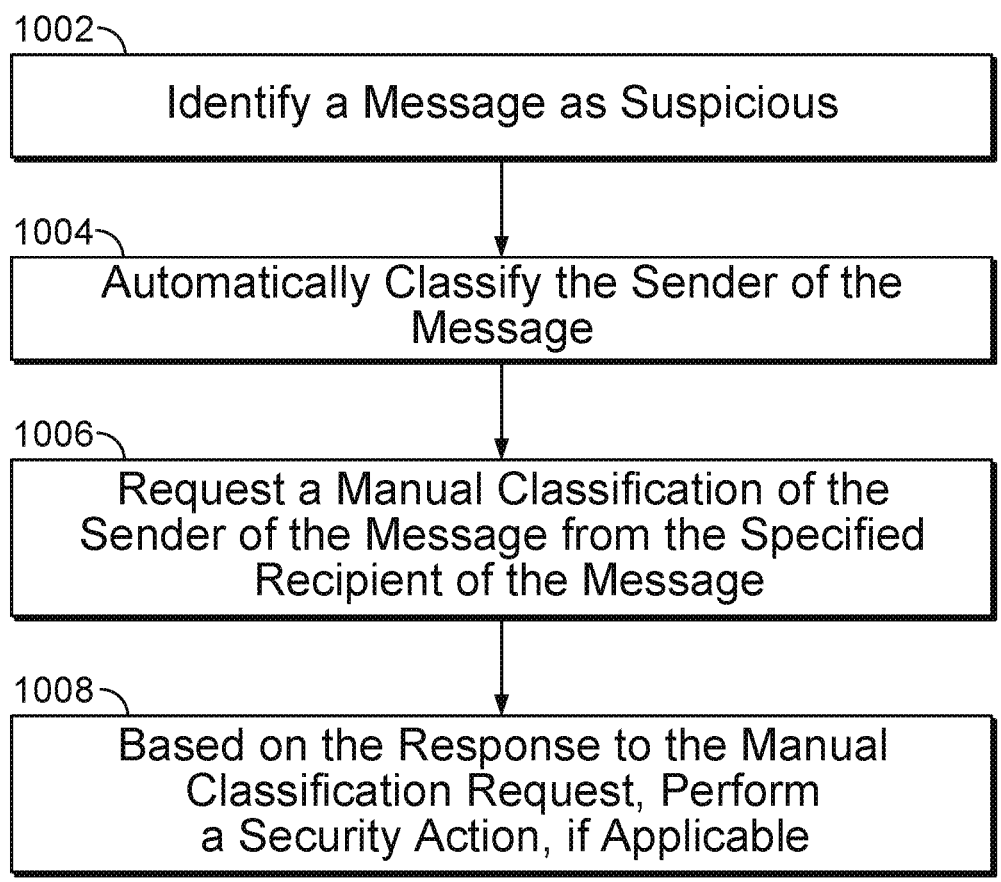
FIG. 10A is a flowchart illustrating an embodiment of a process for detecting misrecognition of a sender of a message by a recipient of the message.

FIG. 10A is a flowchart illustrating an embodiment of a process for detecting misrecognition of a sender of a message by a recipient of the message. The process of FIG. 10A may be at least in part implemented on analysis server 102, gateway 110, and/or message server 106 of FIG. 1. In some embodiments, at least a portion of the process of FIG. 10A is performed in filtering the message in 706 and/or 710 of FIG. 7. In some embodiments, at least a portion of the process of FIG. 10A is performed in one or more steps of the process of FIG. 9. For example, at least a portion of the process of FIG. 10A is performed in performing the first and/or second risk analysis of the process of FIG. 9. At least a portion of the process of FIG. 10A may be performed in the process of FIG. 2. For example, 1002 is performed during the initial analysis of 204, and 1004 and/or 1006 is performed in the secondary analysis of 218.

At 1002, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

In some embodiments, by basing the whether the message is suspicious on knowledge about trusted contacts of the specified recipient of the message, a message is only classified as suspicious and risky based on the likelihood that the recipient will confuse the sender with a trusted contact specific to the recipient. Otherwise, the risk may be marginal if the recipient does not know or trust the sender of the message since the sender is likely not impersonating someone that the recipient already knows. Thus a message is particularly dangerous if it is not from a trusted party, but the recipient thinks it is. In contrast, if the recipient knows that an email from an untrusted party is from an untrusted party, he or she is not as much at risk as he or she is not likely to feel compelled to comply with the requests or instructions in the message At 1004, the sender of the message is automatically classified. In some embodiments, classifying the sender includes identifying a classification/category of the sender. For example, a relationship classification/category of the sender with respect to the specified recipient of the message is automatically determined based on a property of an identifier of the sender (e.g., domain), previous message history between the sender and recipient, and/or other list or database (e.g., database of business contacts of the recipient). Examples of the classification of the sender include a college, a business partner, a friend/acquaintance, or unknown.

For example, if the sender is associated with the same domain as the recipient, then the sender is classified as a colleague classification. This classification may also be used if the email address of the sender is a known personal email address of a user with a colleague message address. This personal address may be determined using manual registration of such addresses by the account owner, as well as by identification of message traffic indicative of a work account being related to a personal account, such as having closely related display names and extensive forwarding of material from one account to the other. If the sender is a service provider or a client of an entity associated with the recipient, then the sender is classified as a business partner classification. This type of classification may be identified by detection of a sufficient volume of message traffic over time between the sender and the recipient, or from a database/list of recorded business contacts/relationships. In some embodiments, the sender is classified as a friend/acquaintance classification for a given sufficient volume of message traffic over time between the sender and the recipient but cannot be classified as a colleague or a business partner. If the sender cannot be classified as a colleague, business partner, or friend/acquaintance, the sender is classified as known/stranger.

In some embodiments, the sender of the message is automatically classified based on a list of trusted contacts tracked for the recipient (e.g., tracked using the process of FIG. 4). For example, a trusted contact in the stored list of trusted contacts may be associated with a classification identifier provided by a user and/or automatically determined. An identifier of the sender of the email may be utilized to locate a corresponding entry in the stored list of trusted contacts to identify its classification.

At 1006, a manual classification of the sender of the message is requested from the specified recipient of the message. For example, before the message is fully provided to the recipient, a classification of the sender of the message is requested from the user in order to verify the recipient's believed classification of the sender as compared to the automatically determined classification. In some embodiments, the message is modified to change, remove, or obfuscate (e.g., remove attachment, remove hyperlinks, hide phone numbers, only retain a beginning portion of contents of the message and hide ending portion of the message, etc.) at least a portion of the message to prevent the recipient from having full access to the message prior to verification of the recipient's knowledge about the sender of the message. In some embodiments, the message is modified to include selection choices corresponding to the classification options (e.g., different selectable HTML hyperlinks included in the message and selection of a particular hyperlink option sends a request to the unique address of the hyperlink that can be detected by a server to identify which classification option was selected based on the unique address of the request corresponding to the selection option). In some embodiments, if a recipient replies to the message to the sender prior to providing the classification, the reply message is held/quarantined at a mail server until it is determined that it is safe to send the message. Another classification option is to identify the sender as a spammer or malware attacker. Selection of this classification may result in the removal of the email and blocking of future messages from the sender.

FIG. 10B shows an example of a modified message requesting manual classification of the sender of the message. Message 1020 includes contents of the original message 1022 as well as added selected choices 1024 that requests the recipient to classify the sender of the message.

Returning to FIG. 10A, at 1008, based on the response to the manual classification request, a security action is performed, if applicable. In some embodiments, if the manual classification response does not match the automatically determined classification, a security action is performed to warn the recipient about the mismatch and/or prevent the user from fully accessing or replying to the message. For example, the message may be deleted and replaced with a version of the message that has been modified (e.g., subject, sender display name, sender address, reply to address, and/or content of the message removed or modified with a warning indicator). In another example, the message may be deleted and quarantined for additional review by the recipient and/or an administrator. In some embodiments, in the event the sender of the message was correctly classified manually by the recipient and the automatic classification was incorrect, an opportunity is provided to add the sender of the message to the list of trusted contacts for the recipient and/or add an identifier of the sender (e.g., email address and display name) to an existing contact (e.g., as a secondary email address) in the list of trusted contacts. The sender may be added to the list of trusted contacts by the recipient, an administrator, or by the sender (e.g., by requiring the user to prove access to an account of an existing trusted contact).

Figure 11A:
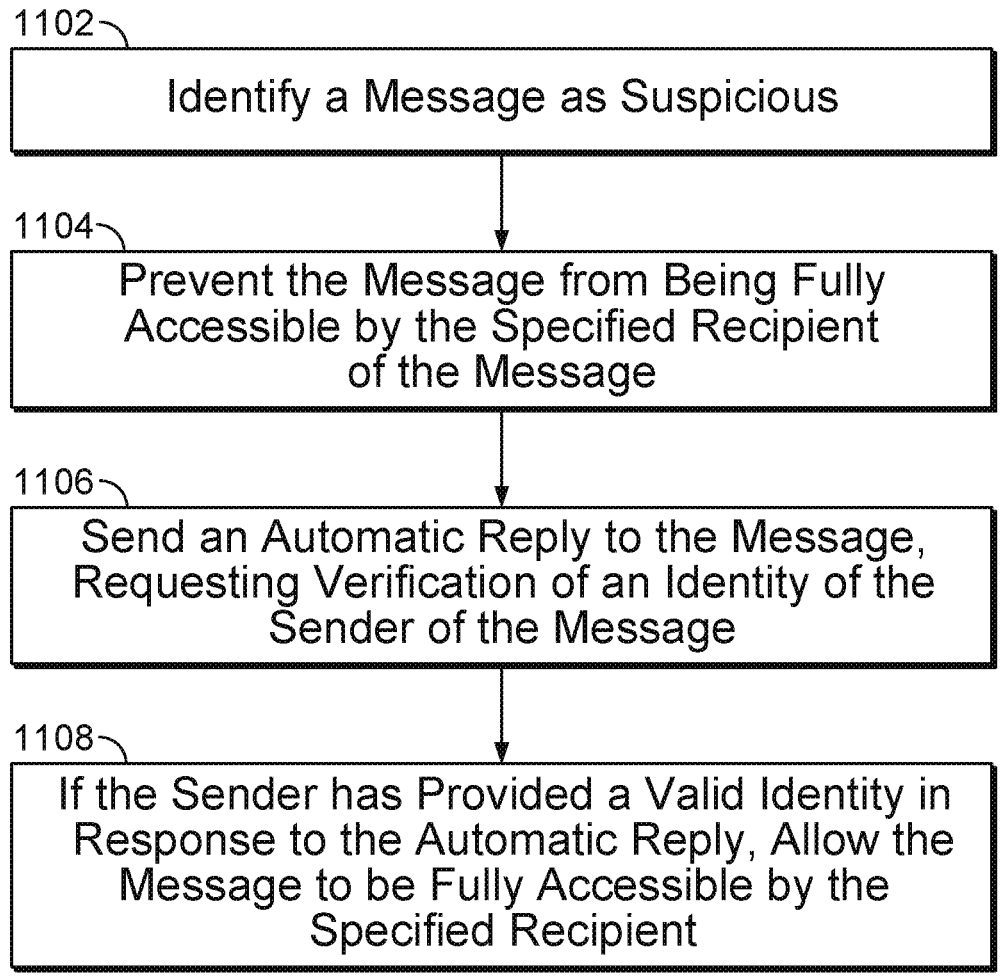
FIG. 11A is a flowchart illustrating an embodiment of a process for requiring a sender of a message to verify an identity of the sender.

FIG. 11A is a flowchart illustrating an embodiment of a process for requiring a sender of a message to verify an identity of the sender. The process of FIG. 11A may be at least in part implemented on analysis server 102, gateway 110, and/or message server 106 of FIG. 1. In some embodiments, at least a portion of the process of FIG. 11A is performed in filtering the message in 706 and/or 710 of FIG. 7. In some embodiments, at least a portion of the process of FIG. 11A is performed in one or more steps of the process of FIG. 9. For example, at least a portion of the process of FIG. 11A is performed in performing the first and/or second risk analysis of the process of FIG. 9. At least a portion of the process of FIG. 11A may be performed in the process of FIG. 2. For example, 1102 is performed during the initial analysis of 204, 1104 is performed during the message modification of 214, and 1106 is performed in the secondary analysis of 218.

At 1102, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 1104, the message is prevented from being fully accessible by the specified recipient of the message. For example, at least a portion of the message is modified or removed. In another example, the message is quarantined and not delivered to the recipient.

At 1106, an automatic reply to the message is sent requesting verification of an identity of the sender of the message.

This verification attempt may be utilized to identify good emails from accounts that are not trusted, but which are nevertheless associated with trusted persons. For example, if one executive's name is John Adams, and another executive receives an email from a John Adams—but not the same account as to which she has a trust relationship—then this is a potentially deceptive email—but also an email that is potentially from another account (such as the personal account) of the trusted person. The reply message includes the message "Your email triggered an alert. Have you sent emails to the recipient using another email address? If so, please click here. Otherwise, click here." The first hyperlink (associated with the first occurrence of "here") would lead to a website where the visitor enters his or her "other" email address (e.g., trusted contact address), and a verification email is sent to that address. That verification email contains a challenge value, such as a secret string of alphanumeric characters, that the recipient has to copy and paste into the site where the email address was entered. The second hyperlink takes the user to a site where he or she is offered to solve a CAPTCHA, associate a phone number (e.g., by sending an SMS challenge value to the phone number), or perform another action that attackers are typically unwilling to perform.

FIG. 11B shows an example of an automatic reply message requesting verification of an identity of the sender of the message. Message 1120 informs the user that the sender's message has been quarantined and will not be delivered unless identity of the sender is established. Message 1120 instructs the sender to forward the automatic reply message to a second message account (e.g., account of trusted contact) that the sender has previously used to communicate with the recipient and using the second account, forward again the forwarded message to a verification system for verification of the possession of the second account.

Returning to FIG. 11A, the automatic reply to the message may be utilized to detect spoofing attempts. For example, the automatic reply is sent to a system of the sender to request verification that the sender identified in the message actually sent the message. For example, at least two installations of message security systems, where a first installation is associated with a first entity and a second installation is associated with a second entity, the second system identifies receipt of an email originating with a sender associated with the first system. The second system then sends an inquiry to the first system, where the inquiry contains information related to the email. The first system determines whether the email associated with the inquiry was sent from the indicated apparent sender, and generates a response to the second system. If the second system receives a negative response, then the email is not delivered to the intended recipient, or if it has already been delivered, then it is either removed from the inbox or a notification is sent to the recipient, warning the recipient of the email. In addition, a notification may be sent to an administrator associated with the second system. In some embodiments, a notification is also sent to an admin associated with the first system. If, on the other hand, the response to the inquiry is a positive response, then the email is delivered to the recipient. If an email has more than one recipient within the second system, then it is delivered to each such recipient. Here, the first and second systems may access emails in different ways. For example, the first system may correspond to an outbound collector of emails and the second system to an OAUTH access of one or more email boxes. The first system may also be an appliance controlling or relaying emails, or be an OAUTH-enabled method to access the various mailboxes (including the sent folder) of one or more users. In some embodiments, all communications between the two security systems are encrypted and authenticated.

At 1108, if the sender has provided a valid identity in response to the automatic reply in 906, the message is allowed to be fully accessible by the specified recipient. For example, if the user has provided an established position of an alternate trusted account that can be trusted (e.g., account of trusted contact) or has otherwise provided or proved an identity of the sender, the message is allowed to be fully accessible. Making the message fully accessible may include allowing the message to be delivered and accessed by the recipient with all of its original content. This may also cause the sender (e.g., sender email address) to be whitelisted or associated with an increased trust value (e.g., add to trusted contacts). In some embodiments, the provided full access message includes a warning, bringing to the attention of the recipient that this is an email from a potential stranger.

If the sender does not provide a valid identity in response to the automatic reply in 906, the message may remain unable to be fully accessible by the specified recipient of the message. In some embodiments, the message is indicated to an administrator and/or deleted.

In some embodiments, if the reply to the address of the message is identified or unknown to be unattended (e.g., not monitored by a recipient user), the message is provided to the recipient in a modified form and/or with a warning.

Figure 12:
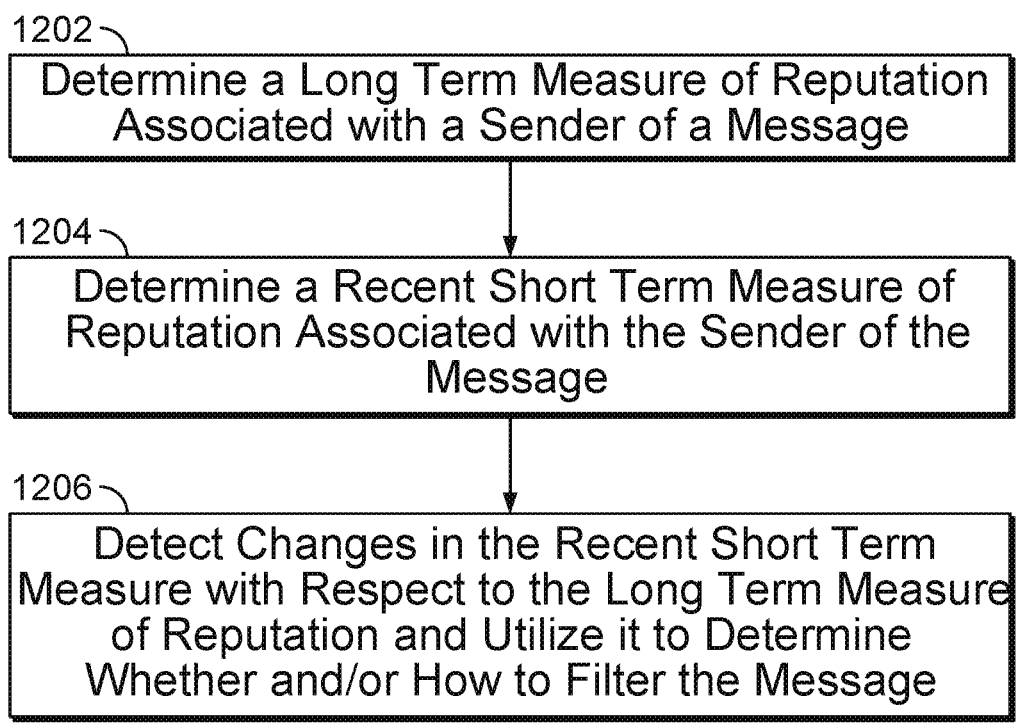
FIG. 12 is a flowchart illustrating an embodiment of a process for determining a change in historical reputation of a sender of a message.

FIG. 12 is a flowchart illustrating an embodiment of a process for determining a change in historical reputation of a sender of a message. The process of FIG. 12 may be at least in part implemented on analysis server 102, gateway 110, and/or message server 106 of FIG. 1. In some embodiments, at least a portion of the process of FIG. 12 is performed in filtering the message in 706 and/or 710 of FIG. 7. In some embodiments, least a portion of the process of FIG. 12 is performed in one or more steps of the process of FIG. 9. For example, at least a portion of the process of FIG. 12 is performed in performing the first and/or second risk analysis of the process of FIG. 9. At least a portion of the process of FIG. 12 may be performed in the process of FIG. 2. For example, at least a portion of the process of FIG. 12 is performed during the secondary analysis of 218.

At 1202, a long term measure of reputation associated with a sender of a message is determined. The long term measure of reputation may be for a specific address and/or domain of the sender. For example, long term measure of reputation is determined based on the amount of historical message traffic between the sender (or network domain of sender) and the recipient (or network domain of recipient). Large amounts of traffic may correspond to a high long term measure of reputation, unless there is a sufficient portion of the traffic that is flagged as undesirable (e.g., being spam, including virus/malware, etc.). Additionally, a long time period of traffic may correspond to a high long term measure of reputation, unless a sufficient portion is flagged as being undesirable. To the extent that it is available, a large open rate (e.g., the recipient opened the message) or a high response rate (e.g., whether replying to message or selecting links in message) also may correspond to a high long term measure of reputation, unless a sufficient portion is flagged as being undesirable. An example of a "sufficient" portion may mean that a fixed portion of the traffic, such as 2%. The long term measure of reputation may capture historical message traffic within several recent months. In some embodiments, when determining a long term measure of reputation for a domain, individual long term measures of reputation for accounts of the domain may be aggregated to determine the long term measure of reputation for the domain.

At 1204, a recent short term measure of reputation associated with the sender of the message is determined. The recent short term measure of reputation may be for a specific address and/or domain of the sender. The recent short term measure of reputation is determined using the same/similar factors as the long term measure of reputation but within a smaller time window. For example, the recent short term measure of reputation may capture historical message traffic within a day.

The recent short term measure of reputation may be low if a large portion (e.g., 5% of traffic within the time window) of message traffic between the sender (or network domain of sender) and the recipient (or network domain of recipient) is associated with complaints, spam detection, the detection of unwanted URLs, or unwanted attachments. An unwanted URL/attachment is one that is judged likely to be associated with risk, e.g., using a blacklist or an anti-virus scan. Complaints may correspond to users reporting an email as spam or phish, or placing it in a spam folder. Complaints can either be local (only a very small number of users, such as less than 1% of recipients, report the message) or pervasive (a greater portion of users report the email, e.g., more than 1%).

At 1206, changes in the recent short term measure with respect to the long term measure of reputation are detected and utilized to determine whether and/or how to filter the message. For example, if the sender is associated with a low (bad) long term measure of reputation (e.g., below a threshold) and a low (bad) recent short term measure (e.g., below another threshold), the message from the sender is identified as suspicious and filtered (e.g., blocked and/or modified with a warning). In some embodiments, if the sender is associated with a high (good) long term measure of reputation (e.g., above a first threshold) but low (bad) recent short term measure (e.g., below a second threshold), the message from the sender is identified as likely taken over by a malicious attacker. For example, the message may be filtered (e.g., blocked and/or modified with a warning), may require manual review by an administrator, or require an action by the sender (e.g., require sender to respond to a challenge) prior allowing delivery of the message (e.g., modified message with warning).

In some embodiments, let $R_i$ be a reputation associated with a receiver, and for concreteness, assume that this corresponds to a numeric value between 0 and 1, inclusive. Let $B_i$ be a recent short term measure of reputation associated with an email E received by the same recipient. For concreteness, this is also a value between 0 and 1, inclusive. Here, i is a number corresponding to the recipient. Further, let G be the long term measure of reputation associated with the email E, and may be a number between 0 and 100, for example. The value $SUM(B_i*R_i)/G$ is computed, where SUM corresponds to adding the entries associated with all recipients of E. If $SUM(B_i*R_i)/G > t1$, where $t1$ is a first threshold, then a first action is taken. This action may be to block emails from the sender of E, remove E from the inbox of all recipients, and determine whether any of the users who appear to have opened E have had their computers corrupted or credentials stolen. This can be determined by asking the user, by scanning the user's machine, or by reviewing logs of incoming/outgoing traffic to the user's machine, where this review is preferably automated. Further, the action may involve increasing $R_i$ by 10% for each user who filed a response $B_i$ indicative of a threat. If $SUM(B_i*R_i)/G < t2$, where $t2<t1$ then the reputation $R_i$ of each user who filed a response $B_i$ indicative of a threat is decreased, e.g., by 5%. If the number of users filing a response $B_i$ is indicative of a threat within a time T of receipt of the email E, then the email is considered to be associated with pervasive badness, otherwise local badness.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   using a processor to determine an initial risk of an electronic message, comprising:
   determining the initial risk based on scores associated with one or more of the following: trust, reputation, authenticity, and/or risk, wherein:
     a score associated with the trust is determined based on a number of messages sent between an apparent sender and a recipient;
     a score associated with the reputation is determined based on an extent to which a sender is recognized based on historical traffic;
     a score associated with the authenticity is determined based on an analysis of a header of the electronic message, determining whether an originating server is associated with an IP address that has been previously utilized by a sender of the electronic message, whether the electronic message has a valid digital signature, or any combination thereof; and/or
     a score associated with the risk is determined based on a heuristically computed score that depends on whether a sender has a Domain-based Message Authentication, Reporting & Conformance (DMARC) reject policy, whether message contents of the electronic message include a uniform resource locator (URL), whether message contents of the electronic message include a potentially executable attachment, whether message contents of the electronic message include keywords associated with high risk, or any combination thereof;
   based on the initial risk, determining whether to modify the electronic message, wherein determining to modify the electronic message includes determining that a potential security threat that requires further analysis has been detected for the electronic message, and wherein determining that the potential security threat has been detected comprises:
     determining both that the initial risk does not correspond to a first category of being a near-certainty benevolent electronic message and that the initial risk does not correspond to a second category of being a near-certainty malice electronic message; and
     determining that the initial risk belongs to a third category of being a remainder portion that is to be modified and further inspected; and
   in an event it is determined to modify the electronic message:
     modifying the electronic message, comprising:
       determining a risk profile of an intended recipient of the electronic message based on a number of electronic messages received by the intended recipient, a reaction of the intended recipient to a received electronic message, or both;
       dynamically determining a modification to be made based at least in part on a first risk profile of the intended recipient or a second risk profile of the intended recipient; and
       applying the modification to the electronic message to form a modified version of the electronic message;
     allowing the modified version of the electronic message to be delivered to the intended recipient of the electronic message;
     after the modified version of the electronic message is delivered to the intended recipient, automatically performing a secondary computer security risk assessment of the electronic message, wherein the secondary computer security risk assessment includes an anti-virus test, a malware test, or both; and
     based on the secondary computer security risk assessment, updating the modified version of the electronic message, wherein updating the modified version of the electronic message based on the secondary computer security risk assessment includes determining whether a result of the secondary computer security risk assessment indicates a sufficient detected security threat for the electronic message, and in an event the result of the secondary computer security risk assessment does not indicate the sufficient detected security threat, allowing the intended recipient to fully access the electronic message without at least a portion of a modification made in the modified version of the electronic message.

2. The method of claim 1, wherein determining the initial risk of the electronic message includes determining whether the electronic message includes an attachment or a macro.

3. The method of claim 1, wherein determining the initial risk of the electronic message includes determining whether the sender of the electronic message is a trusted sender.

4. The method of claim 1, wherein determining the initial risk of the electronic message includes determining whether the electronic message passes Sender Policy Framework (SPF) validation, passes DomainKeys Identified Mail (DKIM) validation, or has been sent from a trusted sender.

5. The method of claim 1, wherein the determination of whether to modify the electronic message is made based on one or more comparisons of one or more scores calculated during an initial analysis with one or more corresponding threshold values.

6. The method of claim 1, wherein modifying the electronic message includes adding a warning to one or more of the following parts of the electronic message: a message sender display name, a message subject, a message body, an attachment name, and an attachment content.

7. The method of claim 1, wherein allowing the modified version of the electronic message to be delivered to the intended recipient of the electronic message includes allowing the intended recipient to access the modified version of the electronic message in a message repository of the intended recipient prior to a completion of the secondary computer security risk assessment.

8. The method of claim 1, wherein the secondary computer security risk assessment is held and not performed until a resource availability criteria has been met.

9. The method of claim 1, wherein performing the secondary computer security risk assessment is based on the determined initial risk.

10. The method of claim 1, wherein performing the secondary computer security risk assessment includes performing a more computationally intensive analysis of content included in or referenced by the electronic message as compared to an analysis performed to determine the initial risk.

11. The method of claim 1, wherein performing the secondary computer security risk assessment includes automatically generating a security inquiry and sending the security inquiry to the sender of the electronic message.

12. The method of claim 1, wherein updating the modified version of the message based on the secondary computer security risk assessment includes determining whether a result of the secondary computer security risk assessment indicates a sufficient detected security threat for the electronic message, and in an event the result of the secondary computer security risk assessment does indicate the sufficient detected security threat, performing one or more of the following:
  moving the modified message from a message inbox to another message folder;
  removing the modified message from a message inbox;
  modifying, removing or replacing at least one message attachment;
  modifying, removing or replacing at least one content location identifier;
  modifying, removing or replacing at least one contact identifier; and
  not allowing the intended recipient to fully access the electronic message.

13. The method of claim 1, wherein determining the initial risk of the electronic message includes determining whether the electronic message includes a hyperlink to a content not known to be trusted.

14. The method of claim 1, wherein modifying the electronic message includes replacing a hyperlink or an attachment included in the message with a proxy hyperlink.

15. The method of claim 1, wherein the determining of the initial risk is based on scores associated with two or more of the following: trust, reputation, authenticity, and/or risk, wherein:
  a score associated with the trust is determined based on a number of messages sent between an apparent sender and a recipient;
  a score associated with the reputation is determined based on an extent to which a sender is recognized based on historical traffic;
  a score associated with the authenticity is determined based on an analysis of a header of the electronic message, determining whether an originating server is associated with an IP address that has been previously utilized by a sender of the electronic message, whether the electronic message has a valid digital signature, or any combination thereof; and/or
  a score associated with the risk is determined based on a heuristically computed score that depends on whether a sender has a Domain-based Message Authentication, Reporting & Conformance (DMARC) reject policy, whether message contents of the electronic message includes a uniform resource locator (URL), whether message contents of the electronic message include a potentially executable attachment, whether message contents of the electronic message include keywords associated with high risk, or any combination thereof.

16. The method of claim 1, wherein the determining of the initial risk is based on scores associated with trust, reputation, authenticity, and risk, wherein:
  a score associated with the trust is determined based on a number of messages sent between an apparent sender and a recipient;
  a score associated with the reputation is determined based on an extent to which a sender is recognized based on historical traffic;
  a score associated with the authenticity is determined based on an analysis of a header of the electronic message, determining whether an originating server is associated with an IP address that has been previously utilized by a sender of the electronic message, whether the electronic message has a valid digital signature, or any combination thereof; and
  a score associated with the risk is determined based on a heuristically computed score that depends on whether a sender has a Domain-based Message Authentication, Reporting & Conformance (DMARC) reject policy, whether message contents of the electronic message includes a uniform resource locator (URL), whether message contents of the electronic message include a potentially executable attachment, whether message contents of the electronic message include keywords associated with high risk, or any combination thereof.

17. A system, comprising:
  a processor configured to:

determine an initial risk of an electronic message, comprising to:
  determine the initial risk based on scores associated with one or more of the following: trust, reputation, authenticity, and/or risk, wherein:
    a score associated with the trust is determined based on a number of messages sent between an apparent sender and a recipient;
    a score associated with the reputation is determined based on an extent to which a sender is recognized based on historical traffic;
    a score associated with the authenticity is determined based on an analysis of a header of the electronic message, determining whether an originating server is associated with an IP address that has been previously utilized by a sender of the electronic message, whether the electronic message has a valid digital signature, or any combination thereof; and/or
    a score associated with the risk is determined based on a heuristically computed score that depends on whether a sender has a Domain-based Message Authentication, Reporting & Conformance (DMARC) reject policy, whether message contents of the electronic message includes a uniform resource locator (URL), whether message contents of the electronic message include a potentially executable attachment, whether message contents of the electronic message include keywords associated with high risk, or any combination thereof;
  based on the initial risk, determine whether to modify the electronic message, wherein determining to modify the electronic message includes determining that a potential security threat that requires further analysis has been detected for the electronic message, and wherein determining that the potential security threat has been detected comprises:
    determining both that the initial risk does not correspond to a first category of being a near-certainty benevolent electronic message and that the initial risk does not correspond to a second category of being a near-certainty malice electronic message; and
    determining that the initial risk belongs to a third category of being a remainder portion that is to be modified and further inspected; and
  in an event it is determined to modify the electronic message:
    modify the electronic message, comprising to:
      determine a risk profile of an intended recipient of the electronic message based on a number of electronic messages received by the intended recipient, a reaction of the intended recipient to a received electronic message, or both;
      dynamically determine a modification to be made based at least in part on a first risk profile of the intended recipient or a second risk profile of the intended recipient; and
      apply the modification to the electronic message to form a modified version of the electronic message;
    allow the modified version of the electronic message to be delivered to the intended recipient of the electronic message;
    after the modified version of the electronic message is delivered to the intended recipient, automatically perform a secondary computer security risk assessment of the electronic message, wherein the secondary computer security risk assessment includes an anti-virus test, a malware test, or both; and
    based on the secondary computer security risk assessment, update the modified version of the electronic message, wherein updating the modified version of the electronic message based on the secondary computer security risk assessment includes determining whether a result of the secondary computer security risk assessment indicates a sufficient detected security threat for the electronic message, and in an event the result of the secondary computer security risk assessment does not indicate the sufficient detected security threat, allowing the intended recipient to fully access the electronic message without at least a portion of a modification made in the modified version of the electronic message; and
  a memory coupled to the processor and configured to provide the processor with instructions.

18. A method, comprising:
  identifying that an electronic message includes an encrypted message content item;
  determining whether to generate a wrapped version of the encrypted message content item based on an initial risk of the electronic message, comprising:
    determining the initial risk based on scores associated with one or more of the following: trust, reputation, authenticity, and/or risk, wherein:
      a score associated with the trust is determined based on a number of messages sent between an apparent sender and a recipient;
      a score associated with the reputation is determined based on an extent to which a sender is recognized based on historical traffic;
      a score associated with the authenticity is determined based on an analysis of a header of the electronic message, determining whether an originating server is associated with an IP address that has been previously utilized by a sender of the electronic message, whether the electronic message has a valid digital signature, or any combination thereof; and/or
      a score associated with the risk is determined based on a heuristically computed score that depends on whether a sender has a Domain-based Message Authentication, Reporting & Conformance (DMARC) reject policy, whether message contents of the electronic message includes a uniform resource locator (URL), whether message contents of the electronic message include a potentially executable attachment, whether message contents of the electronic message include keywords associated with high risk, or any combination thereof;
    determining to modify the electronic message by determining that a potential security threat that requires further analysis has been detected for the electronic message, and wherein determining that the potential security threat has been detected comprises:
      determining both that the initial risk does not correspond to a first category of being a near-certainty benevolent electronic message and that the initial risk does not correspond to a second category of being a near-certainty malice electronic message; and determining that the initial risk belongs to a third category of being a remainder portion that is to be modified and further inspected;

modifying the electronic message to include the wrapped version of the encrypted message content item instead of the original encrypted message content item, comprising:

determining a risk profile of an intended recipient of the electronic message based on a number of electronic messages received by the intended recipient, a reaction of the intended recipient to a received electronic message, or both;

dynamically determining a modification to be made based at least in part on a first risk profile of the intended recipient or a second risk profile of the intended recipient; and applying the modification to the electronic message to form a modified version of the electronic message; and allowing the electronic message with the wrapped version of the encrypted message content item to be delivered;

wherein, in response to a user attempting to access content of the wrapped version of the encrypted message content item after the electronic message with the wrapped version of the encrypted message content item is delivered, the user is provided a request for a decryption password by a wrapper program of the wrapped version and the decryption password is utilized in analyzing a computer security threat of the encrypted message content item prior to allowing the user access to decrypted content of the encrypted message content item, wherein analyzing the computer security threat includes determining whether a result of the analyzing indicates a sufficient detected security threat for the electronic message, and in an event the result of the analyzing does not indicate the sufficient detected security threat, allowing the intended recipient to fully access the decrypted content of the encrypted message content item.

* * * * *